United States Patent Office 3,711,382
Patented Jan. 16, 1973

3,711,382
BIMETAL SPINEL SURFACED ELECTRODES
Paul P. Anthony, Wadsworth, Ohio, assignor to
PPG Industries, Inc., Pittsburgh, Pa.
Continuation-in-part of application Ser. No. 43,377,
June 4, 1970. This application Jan. 15, 1971, Ser.
No. 106,840
Int. Cl. B01r 1/00, 3/06
U.S. Cl. 204—1 R  34 Claims

ABSTRACT OF THE DISCLOSURE

Electrodes suitable for electrolytic purposes, for example, as anodes in the electrolysis of aqueous alkali metal chlorides, are disclosed. The electrodes of this invention comprise spinel outer surfaces on electroconductive substrates. The electrodes of this invention have a low overvoltage and are long lived in the electrolytic cell environment.

CROSS-REFERENCE TO RELATED APPLICATION

Figure 1:
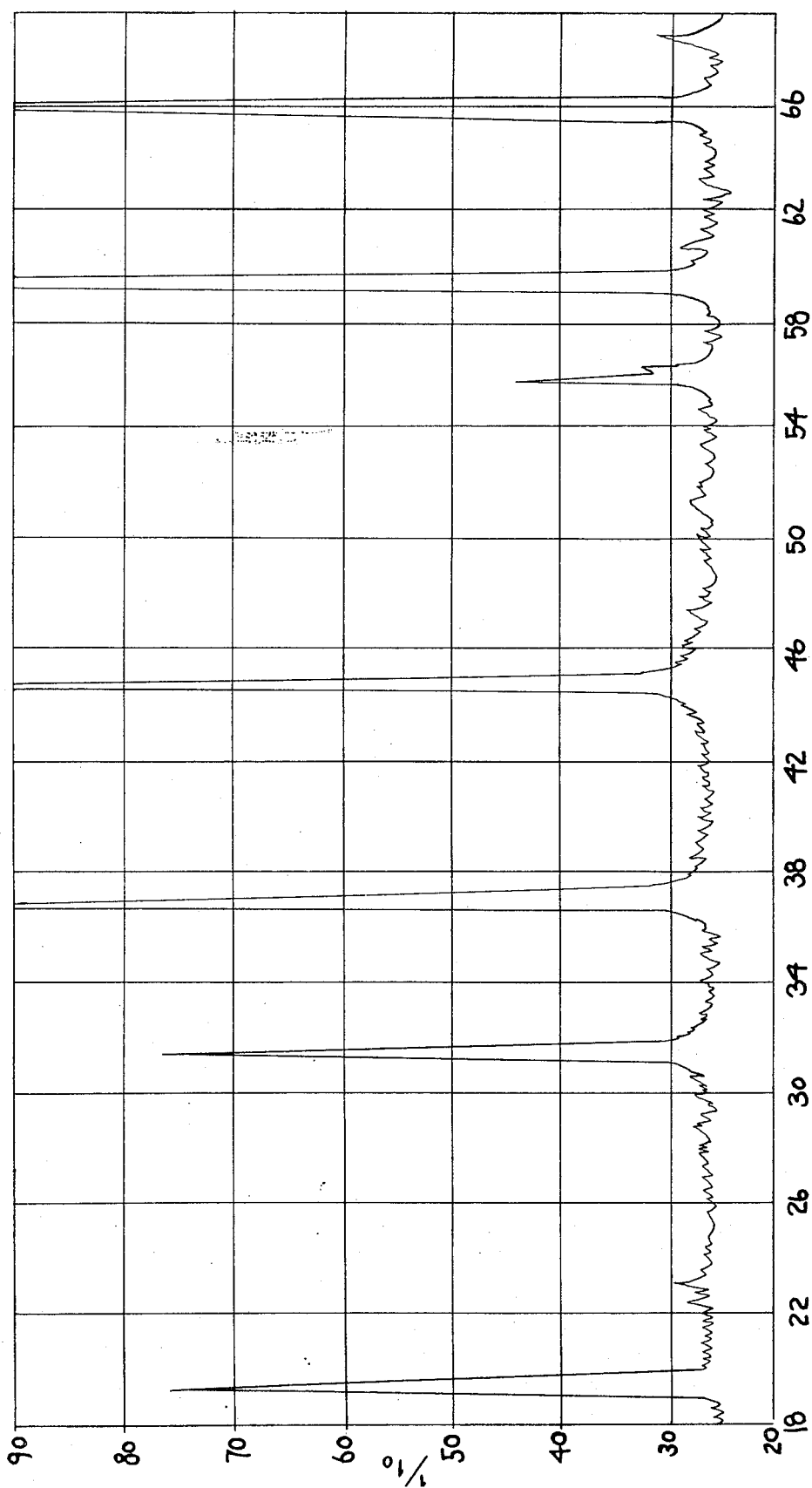

This application is a continuation-in-part of copending application Ser. No. 43,377, filed June 4, 1970, now abandoned, by Paul P. Anthony, for "Electrode Coatings."

BACKGROUND

Chlorine and alkali metal hydroxides, such as lithium hydroxide, sodium hydroxide, and potassium hydroxide, are produced commercially by either of two electrolytic processes—electrolysis in a diaphragm cell or electrolysis in a mercury cell. Alkali metal chlorates are made in a cell similar in structure to a diaphragm cell but not having a diaphragm.

The design and operation of mercury cells, diaphragm cells, and chlorate cells, are more fully treated in Mantell, Electrochemical Engineering, McGraw-Hill, New York, N.Y. (1960), and Sconce, Chlorine, Reinhold, New York, N.Y. (1962).

Common to all three processes has been the use of carbon anodes. These carbon anodes are a constant source of difficulty. They are short lived and subject to uneven wear and erosion. In mercury cells, frequent adjustment is required in order to maintain a constant gap between the cathode and anode and thereby maintain a constant voltage drop across the electrolyte. In diaphragm cells and chlorate cells, no provision is made for varying the anode-cathode space, and, accordingly, the voltage increases with time. Additionally, organic solvents present in the graphite electrodes may plug the diaphragm, resulting in a further increase in voltage. Reaction of the anode products with the graphite anode result in halogenated hydrocarbons being present in the anode product.

Many attempts have been made to remedy these problems. It has long been recognized that a superior anode would be one made of a solid precious metal. However, this is neither economical nor practical. The art shows many attempts to obtain a lower cost electrode having the long life and low overvoltage of a solid precious metal electrode, as well as the low cost of a graphite electrode. These attempts have sought to provide a durable coating, usually of a platinum group metal or platinum group metal oxide, on an electroconductive base, which base usually is composed of a valve metal such as titanium.

These electrodes are noticeably longer in life and operate at lower voltages than carbon electrodes. However, platinum group metals either as such or as their oxides are expensive.

SUMMARY OF INVENTION

According to this invention a novel electrode comprising a bimetal spinel surface disposed upon an electroconductive substrate has been provided. This electrode exhibits durability and low overvoltage characteristics which make it suitable for use as an anode in the electrolysis of alkali metal chlorides. Such electrodes may also be used as anodes in the electrodeposition of metals from aqueous solutions of metal salts, such as in the electrowinning of nickel, cobalt, copper, zinc, and tin. Also they may be used in the cathodic protection of marine equipment. They also may be used as anodes for the conduct of organic electrolytic oxidations.

As used herein, "bimetal spinel" means an oxycompound of two or more different metals having the unique crystal structure and formula characteristic of spinels, i.e., the spinel is one which contains ions of at least two different metals. The spinel may be applied with a suitable binding agent over a suitably-treated metal structural member of substrate, or the spinel may be applied to the substrate by other means. Such spinel itself consists essentially of the two or more metals and oxygen in chemical combination. However, amounts, usually minor amounts, of other materials such as other metal oxides, sulfides, fluorides, or even metals in the metallic state, may be entrapped in or associated with the spinel crystal structure without seriously impairing the desirable properties of the spinel surface.

A suitable electroconductive substrate is one that retains its electroconductive properties during the formation of the spinel surface thereon and in the course of using the resulting electrode for its intended purpose. Such a substrate will be resistant to oxidation during fabrication and electrolysis, and will not be subject to attack by the gases liberated during electrolysis. Preferably, the substrate should be substantially more electroconductive than the spinel itself.

If the electroconductive substrate is of titanium or a like valve-forming metal, which metals readily oxidize to form a non-conductive oxide film, the preferred practice is to take precautions to avoid formation of such undesirable films. In one exemplification of this invention, the electroconductive member, i.e., titanium, is protectively covered with a thin, electroconductive coating such as a platinum group metal layer over which the spinel is placed.

The resulting electrode is long lived in the electrolytic cell environment and has satisfactory over-voltage characteristics.

DESCRIPTION OF INVENTION

Figure 2:
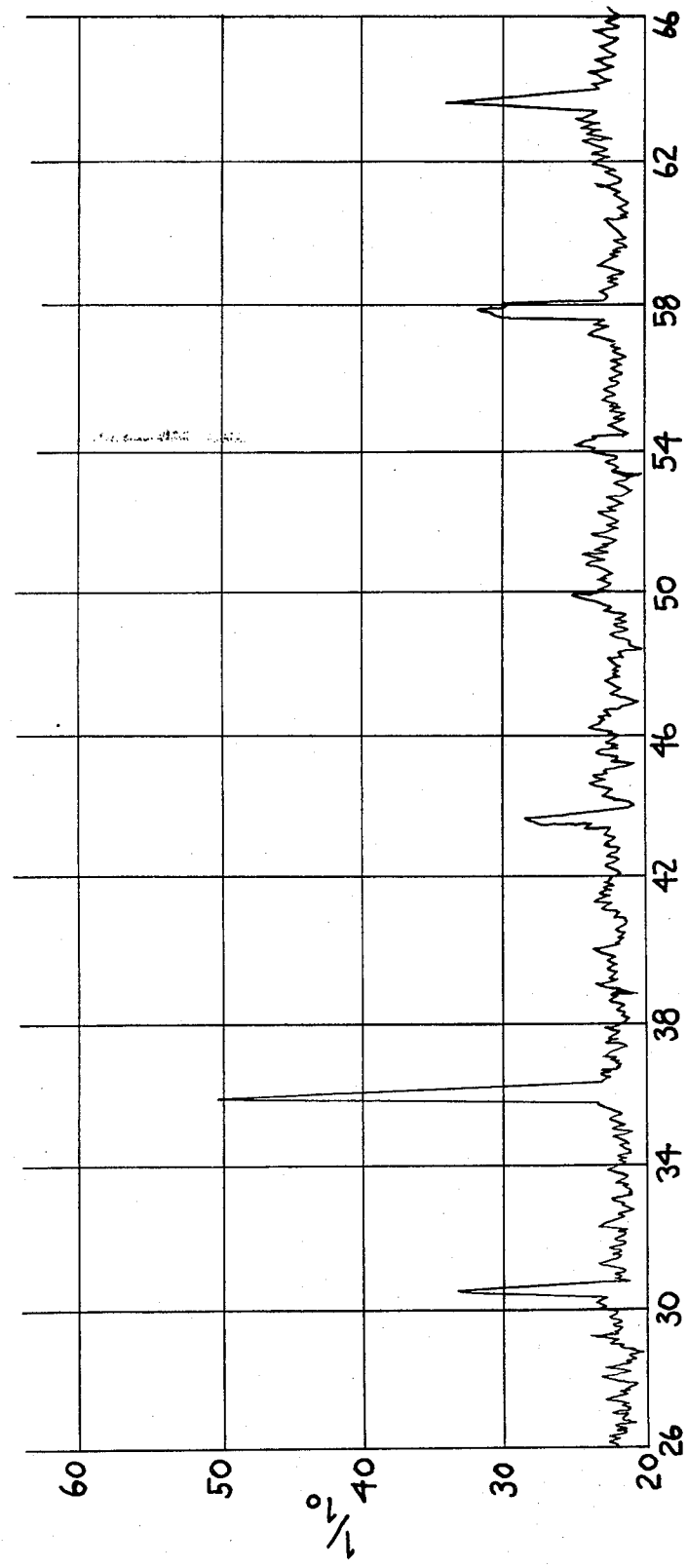
Figure 3:
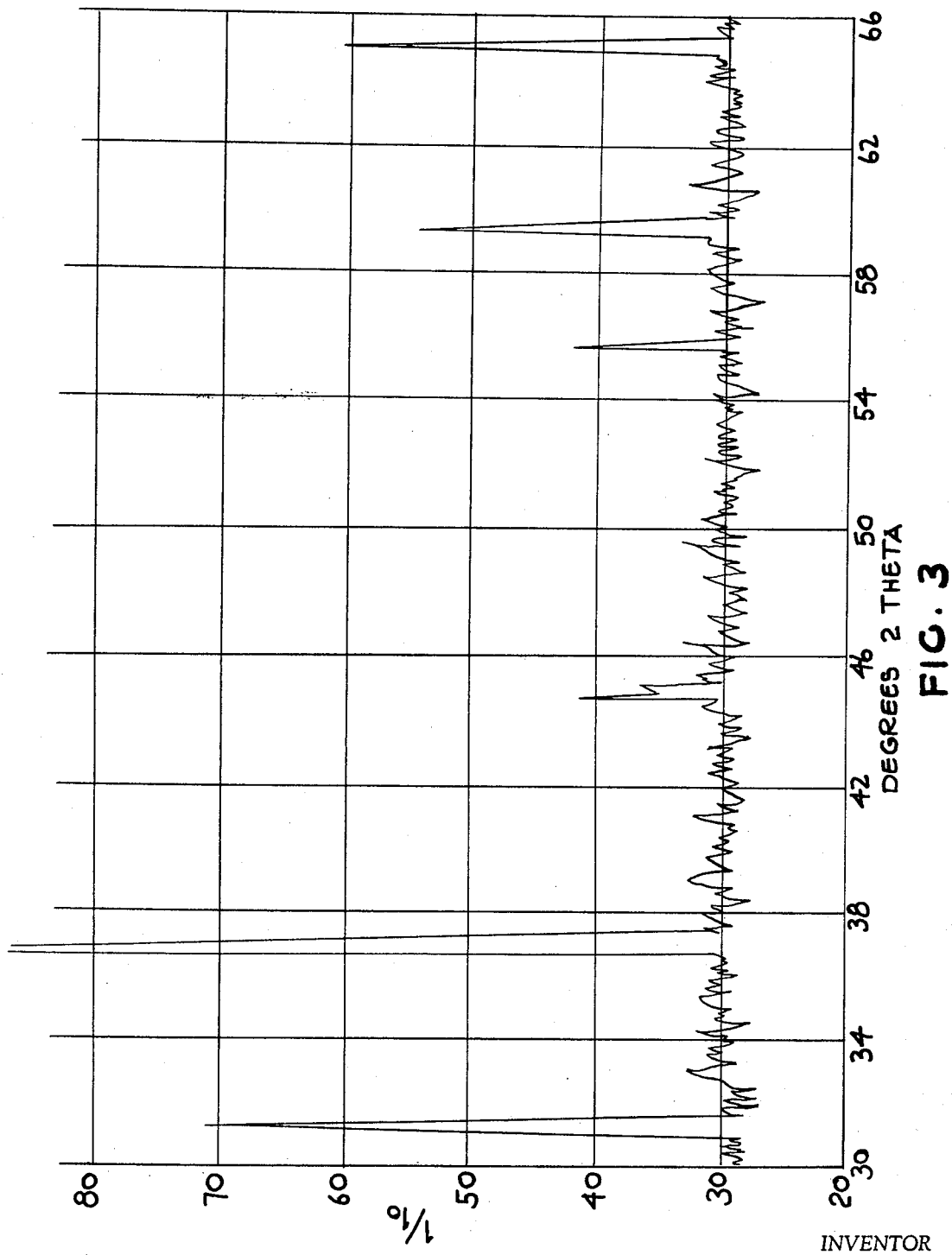
Figure 4:
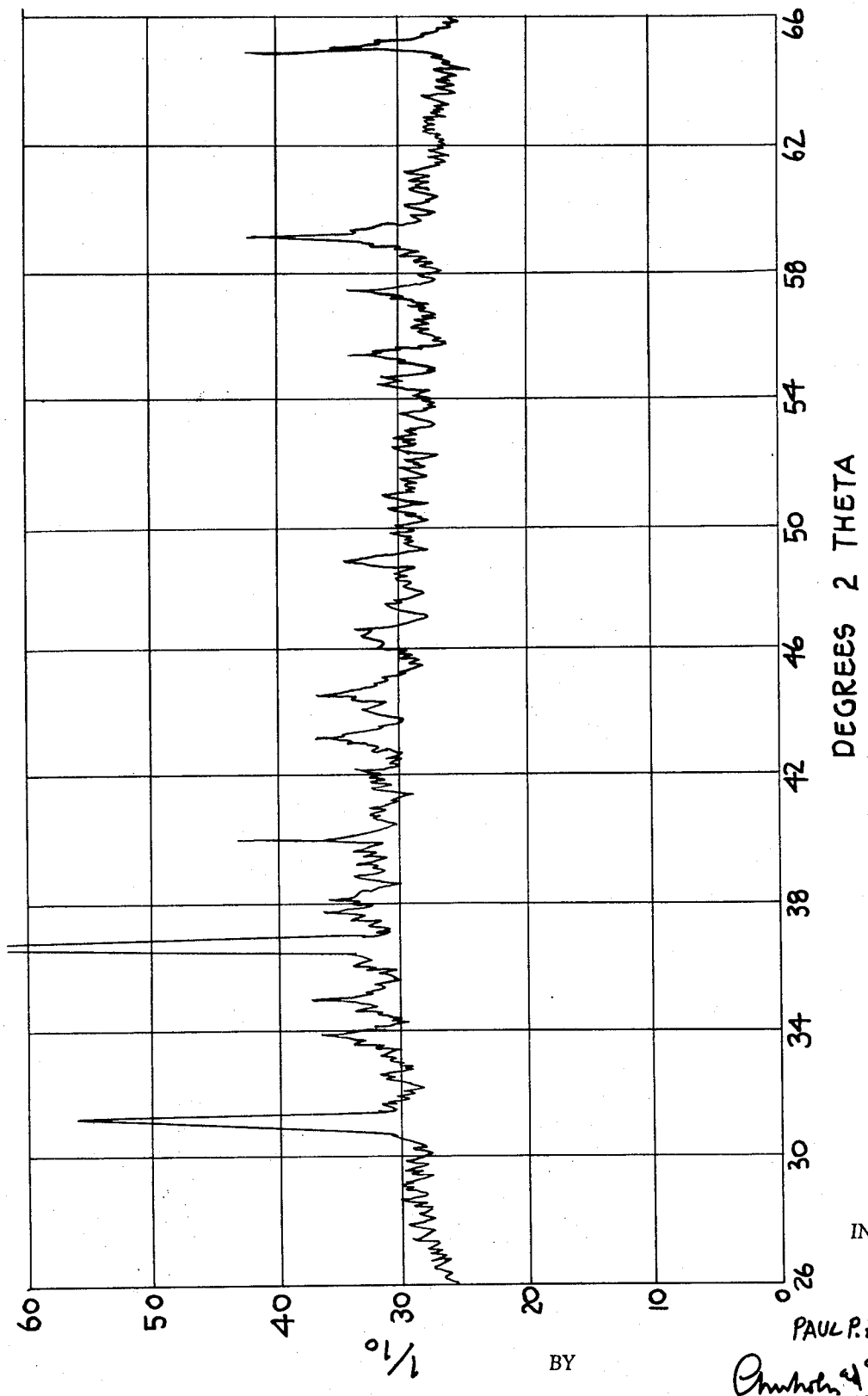
Figure 5:
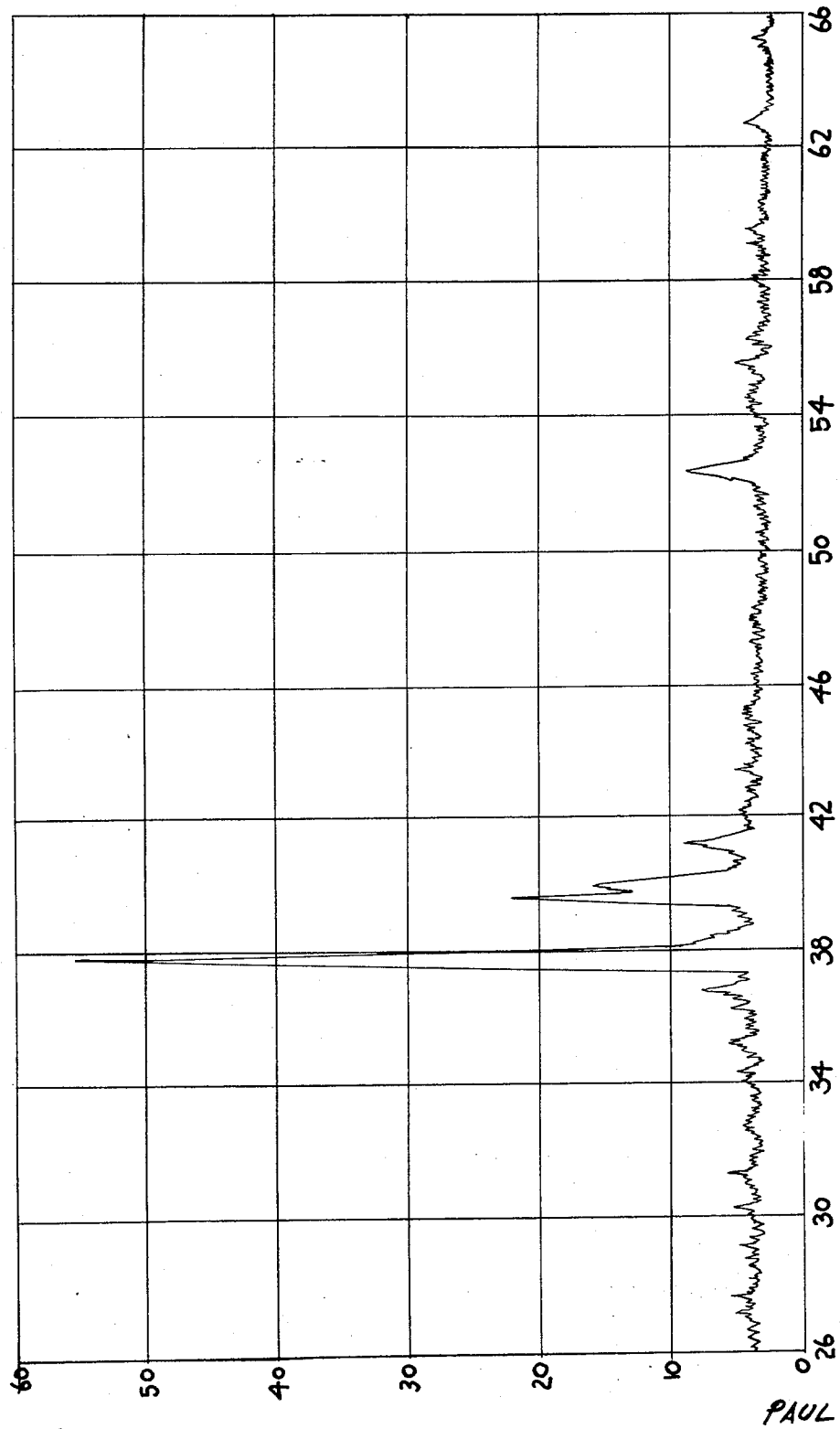

In the drawings:
FIG. 1 is the X-ray diffraction pattern for nickel aluminate spinel.
FIG. 2 is the X-ray diffraction pattern for iron-aluminum spinel.
FIG. 3 is the X-ray diffraction pattern for cobalt-aluminate spinel.
FIG. 4 is the X-ray diffraction pattern for an electrode comprising a cobalt-aluminate spinel surface having silicon dioxide therein on a titanium substrate and having a palladium oxide intermediate layer therebetween.
FIG. 5 is the X-ray diffraction pattern of an electrode comprising a cobalt-aluminate spinel outer surface having titanium dioxide therein on a titanium substrate, and having an intermediate layer containing an alloy of palladium and titanium (which has an X-ray diffraction pattern indicating it to be a $PdTi_2$ alloy).

Suitable electroconductive substrates having a spinel coating produce an anode that is dimensionally stable in an environment where chlorine is electrolytically produced. Bimetal spinels are oxycompounds of two or more metals characterized by a unique crystal structure, stoichiometric relationship, and X-ray diffraction pattern.

Oxycompounds having the spinel structure may be represented by the empirical formula $$M^{II}M^{III}_2O_4$$

where $M^{II}$ represents a metal having a valence of plus 2, $M^{III}$ represents a different metal having a valence of plus 3 as in $NiCr_2O_4$. Spinels are more precisely represented by the empirical formula $$M^{II}(M^{IIIa}M^{IIIb})O_4$$

where $M^{II}$ represents a metal having a valence of plus 2, and $M^{IIIa}$ and $M^{IIIb}$ represent metals having a valence of plus 3. $M^{IIIa}$ and $M^{IIIb}$ may either be the same metal or different metals, and one or both of them may represent the trivalent state of the metal present in the bivalent state, as $Fe^{II}(Cu^{III}Fe^{III})O_4$, or all three metals ions may be ions of different metals as $MgAlFeO_4$. Whenever the term "bimetal spinel" is used herein, it will be understood to mean a spinel having ions of at least two different metals.

The spinel crystal structure and the methods of identifying it by X-ray techniques are described in the literature. For example, the spinel structure is discussed in Wyckoff, Crystal Structure, vol. 3 (2nd Edition), Wiley & Sons, New York (1963) at pages 75 to 86; in Wells, Structural Inorganic Chemistry, Oxford University Press, New York (1950) at pages 379 to 388; in Evans, An Introduction to Crystal Chemistry (2nd edition), Cambridge University Press, New York (1966) at pages 171 to 175; and in Bragg, Claringbull and Taylor, The Crystalline State, vol. 4: Crystal Structures of Minerals, G. Bell & Sons Ltd., London, (1965) at pages 102 to 106.

According to those authorities, the spinel crystal structure may be characterized as comprising oxygen ions in an approximately cubic, close-packed relationship, with the metal ions lying in holes of the packing. Crystal structures having close-packed atoms or ions may be conveniently considered, for purposes of illustration, as being arranged in layers. In the spinel lattice having metal ions and layers of close-packed oxygen ions, the metal ions are smaller than the oxygen ions and are found between the layers of oxygen ions. The relationship within the lattice may be shown by imagining that the layers of oxygen ions are taken apart, leaving associated with each layer of oxygen ions the metal ions immediately in contact with the upper surface of the layer of oxygen ions. In this way the spinel structure may be regarded as built up of two kinds of alternate layers which layers are superposed one on top of the other in an alternating manner. The spinel structure may be further characterized in that one third of the metal ions have 4 oxygen neighbors which oxygen neighbors are arranged tetrahedrally to the metal ion, and that two thirds of the metal ions have 6 oxygen neighbors which oxygen neighbors are arranged octahedrally to the metal ion.

In each of the layers of close-packed oxygen ions are diagonal chains of metal ions having octahedral geometry. The octahedral metal ions are linked laterally above and below the layer of oxygen ions by the metal ions having tetrahedral geometry. The direction of the chains in any layer is normal to the direction of the chains in the adjacent layer. Four layers make up a unit cell.

The unit cell referred to above is in an arbitrary parallelepiped which is the smallest repetitive unit identifiable as the crystal. The unit cell generally, as a matter of convenience, conforms to the symmetry of the system to which the crystal belongs. The unit cell is defined by the lengths of its edges, and the angles included between them. The edges of the unit cell are termed unit translations in the pattern. Starting from any point of origin in the lattice and going a distance equal to and parallel to any cell edge, or by any combination of such movements, we arrive at a point where the whole surrounding structure has the same form and orientation as at the point of origin. Because of the arbitrary nature of the definition of the unit cell, any one ion may be entirely within one cell or it may, alternatively, be divided between two, four, or eight unit cells. Additionally, the neighbor of any one ion may be in the same unit cell or in an adjacent unit cell.

The spinel unit cell contains eight "formula weights," i.e., eight $M^{II}M_2^{III}O_4$ units. More particularly, the crystallographic unit cell of the spinel structure contains 32 oxygen ions. There are equivalent positions in this cell for 8 metal ions surrounded tetrahedrally by 4 oxygen ions, and for 16 metal ions surrounded octahedrally by 6 oxygen ions.

Spinels may further be characterized on the basis of which metal ions occupy which positions in the crystal structure. Those spinels wherein the positions of tetrahedral coordination are occupied by the divalent metallic ions and the positions of octahedral coordination are occupied by the trivalent metal ions are "regular" spinels. Those spinels reported in the literature as being "regular" spinels, and their stoichiometric formulae, include: the magnesium-vanadium spinel ($MgV_2O_4$); the zinc-vanadium spinel ($ZnV_2O_4$); the magnesium-chromium spinel ($MgCr_2O_4$); the manganese-chromium spinel ($MnCr_2O_4$); the iron-chromium spinel ($FeCr_2O_4$); the cobalt-chromium spinel ($CoCr_2O_4$); the nickel-chromium spinel ($NiCr_2O_4$); the copper-chromium spinel ($CuCr_2O_4$); the zinc chromium spinel ($ZnCr_2O_4$); the zinc-manganese spinel ($ZnMn_2O_4$); the zinc-iron spinel ($ZnFe_2O_4$); the cadmium-iron spinel ($CdFe_2O_4$); the copper-cobalt spinel ($CuCo_2O_4$); the zinc-cobalt spinel ($ZnCo_2O_4$); the magnesium-rhodium spinel ($MgRh_2O_4$); the zinc-rhodium spinel ($ZnRh_2O_4$); the magnesium-aluminum spinel ($MgAl_2O_4$); the manganese-aluminum spinel ($MnAl_2O_4$); the iron-aluminum spinel ($FeAl_2O_4$); the cobalt-aluminum spinel ($CoAl_2O_4$); the zinc-aluminum spinel ($ZnAl_2O_4$); the nickel-aluminum spinel ($NiAl_2O_4$); and the calcium-gallium spinel ($CaGa_2O_4$).

Other spinels, wherein the tetrahedral positions are occupied by one-half of the trivalent metal ions and wherein the remaining one-half of the trivalent metal ions along with all of the divalent metal ions are in octahedral positions, are characterized as "inverse" spinels. In "inverse" spinels the arrangement of octahedral divalent and octahedral trivalent positions is substantially random. Such spinels, and their stoichiometric formulae, include: the titanium-magnesium spinel ($TiMg_2O_4$); the vanadium-magnesium spinel ($VMg_2O_4$); the magnesium-iron spinel ($MgFe_2O_4$); the titanium-iron spinel ($TiFe_2O_4$); the cobalt-iron spinel ($CoFe_2O_4$); the nickel-iron spinel ($NiFe_2O_4$); the copper-iron spinel ($CuFe_2O_4$); the titanium-zinc spinel ($TiZn_2O_4$); the tin-cobalt spinel ($SnCo_2O_4$); the tin-zinc spinel ($SnZn_2O_4$); the magnesium-gallium spinel ($MgGa_2O_4$); the magnesium-indium spinel ($MgIn_2O_4$); the manganese-indium spinel ($FeIn_2O_4$); the cobalt-indium spinel ($CoIn_2O_4$); and the nickel-indium spinel ($NiIn_2O_4$).

In still other spinels, the distribution of metal ions is less regular, the spinels exhibiting both normal and inverse arrangement, as is discussed, for example in Bragg, Claringbull, and Taylor, The Crystalline State, vol. 4; Crystal Structure of Minerals, G. Bell & Sons, Ltd., London (1965) at pages 105 and 106.

Also $Fe_2O_3$ and $Al_2O_3$ reportedly have structures which permit significant quantities of either or both to be present in the spinel lattice without deleterious effects.

The spinel crystallographic unit gives a unique X-ray diffraction pattern corresponding to the spacings between the crystallographic planes. Typically, the observation of this X-ray diffraction pattern involves subjecting spinel samples to X-rays from a copper target. Methods of accomplishing this are more particularly described in chapter 5 of Klug and Alexander, X-ray Diffraction Procedures, John Wiley and Sons, Inc., New York (1954), at pages 235 to 318, and especially at pages 270 to 318, and in Newfield, X-ray Diffraction Methods, John Wiley and Sons, Inc., New York, N.Y., (1966), at pages 177 to 207. As described therein, these X-rays have a wave length of 1.5405 angstrom units. The X-rays diffracted by the sample are particularly intense at certain angles, $\theta$, resulting in peaks on diffractometer print-outs as FIGS. 1, 2, 3, 4, and 5, or in lines on photographic diffraction patterns. This high intensity is caused by the X-rays "reflected" from parallel planes in the crystal reinforcing each other. The wave length of the X-rays, the spacing of the planes in the crystal, and the angle, $\theta$, are related by Bragg's Law. Bragg's Law is $$2nd \sin \theta = n\lambda$$

where $d$ is the distance between the planes of the crystal, $n$ is an integer, $\lambda$ is the wave length of the X-rays, and $\theta$ is the angle of incidence of the X-rays, and also the angle of reflection of the X-rays.

Typically, X-ray diffraction data is obtained from a diffractometer that is direct reading in $2\theta$, wherein 180 degrees $-2\theta$ is the angle between the incident ray and the reflected ray. One way of recording X-ray diffraction data is in the form of a graph of the intensity of the reflected ray versus $2\theta$. X-ray diffraction data recorded in this way is shown in FIGS. 1, 2, 3, 4, and 5.

FIG. 1 is a graph of the intensity of the reflected ray versus $2\theta$ for a sample of $NiAl_2O_4$ spinel powder prepared from the mixed oxides according to Procedure I–A Preparation of Spinels From the Mixed Oxides, and used in the practice of Example VIII of this invention. Particularly to be noted is the strong peak at an angle of 37.10 degrees corresponding to an interplanar distance of 2.421 angstroms. Also to be noted are the peaks at angles of 31.56 degrees, 45.04 degrees, 66.50 degrees. These peaks are approximately equal to each other in intensity and of substantially lower intensity than the peak at 37.10 degrees. These peaks correspond to interplanar distances of 2.8324 angstroms, 2.011 angstroms, and 1.424 angstroms, respectively. The theoretical values, from A.S.T.M., X-ray Powder Diffraction Files (1967), are 2,846, 2,013, and 1.423 angstroms, respectively. The high background noise is caused by the closeness of nickel to the copper of the target in the periodic chart.

FIG. 2 is a graph of the intensity of the reflected ray versus $2\theta$ for a sample of $FeAlFeO_4$ spinel powder prepared according to Procerude I–B, Preparation of the Iron-Aluminum Spinel From the Mixed Oxides, and used in the practice of Example XIV of this invention. This spinel is believed to be an "inverse" spinel as discussed above. Particularly to be noticed is the strong peak at 35.96 degrees, corresponding to an interplanar distance of 2.495 angstroms. Also to be noted are the strong peaks at angles of 30.50 degrees, 57.70 degrees, and 63.50 degrees. These peaks are of approximately equal intensity to each other, and of substantially lower intensity than the peak at 35.96 degrees. These angles correspond to interplanar distances of 2.928 angstroms, 1.596 angstroms, and 1.464 angstroms, respectively.

FIG. 3 is a graph of the intensity of the reflected ray versus $2\theta$ for a sample of $CoAl_2O_4$ spinel powder prepared according to Procedure I–A, Preparation of Spinels From the Mixed Oxides, and used in the practice of Example II of this invention. Particularly to be noted is the strong peak at an angle of 36.78 degrees corresponding to an interplanar distance of 2.442 angstroms. The peaks at 31.28 degrees, 59.18 degrees, and 64.98 degrees are of approximately equal intensity but of substantially lower intensity than the peak at 36.78 degrees, and correspond to interplanar distances of 2.864 angstroms, 1.560 angstroms, and 1.434 angstroms. The theoretical interplanar distances, from A.S.T.M., X-ray Powder Diffraction Files (1967, are 2.443 angstroms, 2.864 angstroms, 1.560 angstroms, and 1.432 angstroms, respectively. Again, the high level of background noise is caused by the closeness of cobalt to the copper target in the periodic chart.

FIG. 4 is a graph of the intensity of the reflective ray versus two theta for an electrode prepared according to Example XXVII and consisting of a titanium member having thereon an outer surface of a cobalt aluminate bimetal spinel and silicon dioxide and an intermediate layer of palladium oxide between the cobalt aluminate, silicon dioxide outer surface and the titanium member. The peak at 33.92 degrees two theta is the characteristic PdO peak reported in the literature. Also to be noted are the characteristic cobalt aluminate spinel peaks at (in numerical order) 31.28 degrees two theta, 36.78 degrees two theta, 59.18 degrees two theta, and 64.98 degrees two theta.

FIG. 5 is a graph of the intensity of the reflective ray versus two theta for an electrode consistnig of a titanium member having an outer surface of cobalt-aluminate spinel and titanium dioxide with an intermediate layer therebetween comprising an alloy of palladium and titanium. To be noted are the peaks at angles (in numerical order) of 17.69 degrees, 39.67 degrees, 41.10 degrees, and 74.68 degrees. Particularly to be noted is the breadth and intensity of the peak in the vicinity of 39.67 degrees two theta. These peaks correspond to the peaks reported in the literature for an alloy comprising palladium and titanium in an atomic ratio of 2 atoms of titanium per atom of palladium. Also to be noted are peaks at angles of approximately 31.2 degrees, 36.7 degrees to 36.8 degrees, 59.5 degrees, and 65.2 degrees, corresponding to the peaks reported in the literature for cobalt-aluminate spinel.

Good electrochemical results have been obtained with all bimetal spinels which have been tested. Bimetal spinels, including normal and inverse spinels, as well as those exhibiting both the normal and inverse arrangement are contemplated:

The spinels of magnesium, including titanium-magnesium spinel ($TiMg_2O_4$), vanadium-magnesium spinel ($VMg_2O_4$), and tin-magnesium spinel ($SnMg_2O_4$).

The spinels of vanadium, including magnesium-vanadium spinel ($MgV_2O_4$), iron-vanadium spinel ($FeV_2O_4$), and zinc-vanadium spinel ($ZnV_2O_4$).

The spinels of chromium including magnesium-chromium spinel ($MgCr_2O_4$), maganese-chromium spinel ($MnCr_2O_4$), iron-chromium spinel ($FeCr_2O_4$), cobalt-chromium spinel ($CoCr_2O_4$), nickel-chromium spinel ($NiCr_2O_4$), copper-chromium spinel ($CuCr_2O_4$), zinc-chromium spinel ($ZnCr_2O_4$), and cadminum-chromium spinel ($CdCr_2O_4$).

The spinels of manganese, including titanium-maganese spinel ($TiMn_2O_4$), and zinc-manganese spinel $$(ZnMn_2O_4)$$

The spinels of iron, including magnesium-iron spinel ($MgeF_2O_4$), titanium-iron spinel ($TiFe_2O_4$), maganese-iron spinel ($MnFe_2O_4$), cobalt-iron spinel ($CoFe_2O_4$), nickel-iron spinel ($NiFe_2O_4$), copper-iron spinel $$(CuFe_2O_4)$$

zinc-iron spinel ($ZnFe_2O_4$), cadimum-iron spinel $$(CdFe_2O_4)$$

lead-iron spinel ($PbFe_2O_4$), and aluminum-iron spinel ($FeAlFeO_4$).

The spinels of cobalt including magnesium-cobalt spinel ($MgCo_2O_4$), titanium-cobalt spinel ($TiCo_2O_4$), copper-cobalt spinel ($CuCo_2O_4$), zinc-cobalt spinel ($ZnCo_2O_4$), and tin-cobalt spinel ($SnCo_2O_4$).

The spinels of nickel including iron-nickel -spinel ($FeNi_2O_4$) and germanium-nickel spinel ($GeNi_2O_4$).

The spinels of rhodium including magnesium-rhodium spinel ($MgRh_2O_4$), cadmium-rhodium spinel ($CdRh_2O_4$), cobalt-rhodium spinel ($CoRh_2O_4$), copper-rhodium spinel ($CuRh_2O_4$), manganese-rhodium spinel ($MnRh_2O_4$), nickel-rhodium spinel (NiRh₂O₄), and zinc-rhodium spinel (ZnRh₂O₄).

The zinc spinels including titanium-zinc spinel (TiZn₂O₄), and tin-zinc spinel (SnZn₂O₄).

The aluminum spinels including magnesium-aluminum spinel (MgAl₂O₄), strontium-aluminum spinel (SrAl₂O₄), chromium-aluminum spinel (CrAl₂O₄), molybdenum-aluminum spinel (MoAl₂O₄), manganese-aluminum spinel (MnAl₂O₄), iron-aluminum spinel (FeAl₂O₄), cobalt-aluminum spinel (CoAl₂O₄), nickel-aluminum spinel (NiAl₂O₄), copper-aluminum spinel (CuAl₂O₄), and zinc-aluminum spinel (ZnAl₂O₄).

The gallium spinels including magnesium-gallium spinel (MgGa₂O₄), zinc-gallium spinel (ZnGa₂O₄), and calcium-gallium spinel (CaGa₂O₄).

The indium spinels including magnesium-indium spinel (MgIn₂O₄), calcium-indium spinel (CaIn₂O₄), manganese-indium spinel (MnIn₂O₄), iron-indium spinel (FeIn₂O₄), cobalt-indium spinel (CoIn₂O₄), nickel-indium spinel (NiIn₂O₄), cadmium-indium spinel (CdIn₂O₄), and mercury-indium spinel (HgIn₂O₄).

The spinels containing ions of three metals, such as magnesium-aluminum-iron spinel (MgFeAlO₄), and nickel-aluminum-iron spinel (NiFeAlO₄).

Better results are obtained with aluminate spinels, that is where one or both of the ions present in the plus 3 valence state is aluminum, as in CuAl₂O₄, CoAl₂O₄, FeAlFeO₄, and NiAl₂O₄.

Best results are obtained with the heavy metal-aluminate spinels, that is where the metal ion present in the plus 2 valence state is iron, cobalt, or nickel, as in Fe$^{II}$AlFe$^{III}$O₄, CoAl₂O₄, and NiAl₂O₄, and with the heavy metal ferrite spinels, that is, where iron is present in the plus 3 value state, as in CoFe₂O₄, MgFe₂O₄, and NiFe₂O₄.

Whenever FeAlFeO₄ is referred to herein, it is understood that this material may actually be a mixture of Fe$^{II}$Fe$_2^{III}$O₄, FeAl₂O₄, and Fe$^{II}$AlFe$^{III}$O₄. This material may be characterized by the presence of iron in both the plus 2 and plus 3 valence states, as well as the presence of aluminum in the plus 3 valence state. Additionally, FeO, Fe₂O₃, and Al₂O₃ may also be present.

Preferably, the spinel itself should have some appreciable electroconductivity when measured in bulk. While good results have been obtained with a spinel having an electroconductivity as low was $10^{-5}$ (ohm-centimeters)$^{-1}$, generally the conductivity should be at least $10^{-1}$ (ohm-centimeters)$^{-1}$. Moreover, the thin spinel coatings appear to exhibit greater conductivity when the electrodes are used as anodes in the electrolysis of aqueous sodium chloride to produce chlorine and sodium hydroxide. Thus, some electro-catalytic effect may play a role in the electrolytic processes herein contemplated.

The temperatures which have been resorted to for the preparation of spinels, typically ranging from about 750° C. to about 1350° C., are far above the temperatures which decompose and volatilize various compounds of the oxidation inhibitors and the binding agents and, in a normal atmosphere, oxidize the surface of the substrate. For this reason when the spinel is formed in contact with the substrate, as for example, from mixed oxides of the metals, the substrate or support member may suffer some degree of oxidation and, in such a case, the electrode may show a much higher voltage than is desirable. But when the spinel is formed prior to being applied to the substrate or support member, the highest temperature that the member is exposed to is the higher of either the decomposition temperature of the oxidation inhibitor, where present, or of the binding agent compound, and the degree of oxidation of the member is negligible.

For this reason, it is desirable that the spinel be formed prior to being applied to the support member. This can be accomplished by oxidation of the mixed metals, or by mixing and subsequent heating of the mixed oxides, or by coprecipitation from solutions of compounds of the metals followed by heating or by thermal decomposition of compounds of the mixed metals. The preferred compounds are those which decompose directly to the oxides on heating and do not leave a residue, as carbonates, formates, nitrates, and oxalates, e.g.:

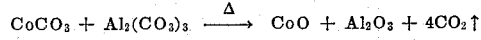

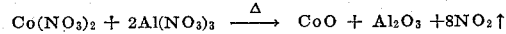

The resulting product is an intimate mixture of the two oxides which can be heated to form the spinel.

Depending on the method of forming the mixed oxide and the degree of comminution thereof, it is possible that all of the mixed oxide will not necessarily be converted to a spinel but that some will remain as the original oxide. This has no deleterious effect on the anode. The less soluble oxides, as Al₂O₃, will remain on the anode without deleterious effect, while the more soluble oxide, as CoO or NiO, may be dissolved by the anolyte when the finished electrode is employed as an anode.

In one exemplification, the preferred spinel is applied to the substrate in the form of a finely-ground slurry of the spinel in a suitable liquid carrier. The slurry may be applied by spraying or brushing. The carrier, typically a thermally-decomposable and/or volatile liquid, often together with a resinous binder, is thereafter decomposed by heating the substrate, yielding volatiles.

When the spinel is applied in this way, it is likely that the resulting surface will exhibit some degree of porosity. For example, after 5 coats of a slurry comprising minus 325 mesh spinel, titanium resinate, and toluene have been applied, it is possible to optically observe at a magnification of 150 times the layers of material (as the substrate or any intermediate layers between the substrate and the spinel) between individual spinel fragments. The surface under such magnification exhibits considerable irregularities, as ridges, valleys, peaks, crystal boundaries, and breaks.

The heating of the spinel slurry coating to form the desired surface bonded to the substrate may take place in air. While it may also take place under an inert atmosphere, as helium, argon, neon, krypton, xenon, carbon dioxide, or nitrogen, or other relatively inert gases, care must be taken to avoid recourse to temperatures or other conditions which cause the spinel lattice to break down. Thus, the presence of some oxygen in the surrounding atmosphere will prevent or minimize such breakdown of the spinel lattice.

The heating may take place at atmospheric pressure, or at a total pressure below atmospheric pressure, or at a total pressure above atmospheric pressure. The heating may also take place at a standard partial pressure of oxygen (approximately 2.6 pounds per square inch partial pressure of oxygen), or at a lower or higher partial pressure of oxygen, typically at oxygen partial pressures of from about $10^{-6}$ millimeters of mercury to about 15 pounds per square inch. Satisfactory results are obtained at normal atmospheric total pressure and at normal atmospheric partial pressure of oxygen. Satisfactory results may also be obtained by heating under an atmosphere having a standard atmospheric total pressure but a reduced partial pressure of oxygen as, for example, an inert atmosphere. Satisfactory results may also be obtained by heating under a total pressure greater than 14.7 pounds per square inch absolute and a partial pressure of oxygen less than 2.6 pounds per square inch absolute, as, for example, under a relatively inert gas atmosphere at a total pressure in excess of 14.7 pounds per inch. When, however, the heating takes place under a partial pressure of oxygen below the normal atmospheric partial pressure of oxygen, care must be exercised to prevent breakdown of the spinel lattice.

Any suitable electroconductive material resistant to attack by the chlorine cell environment may be used as the substrate or support member of the electrode of this invention useful as an anode for brine electrolysis. Most commonly used as the "valve" metals; that is, those metals which form a passivating oxide film, conductive only in the cathodic direction. The valve metals include titanium, tantalum, tungsten, hafnium, zirconium, aluminum, and columbium and alloys thereof. Such valve metals typically have an electrical conductivity of about $10^5$ (ohm centimeters)$^{-1}$ to about $10^6$ (ohm centimeters)$^{-1}$, and have an oxide coating having an electrical conductivity of from about $10^{-13}$ (ohm centimeters)$^{-1}$ to about $10^{-11}$ (ohm centimeters)$^{-1}$. Titanium and tantalum are preferred. Titanium yields best results. Carbon and graphite may also be used. These materials have a conductivity considerably greater than that of the spinel, usually being $10^3$ (ohm centimeters)$^{-1}$ or higher. In accordance with a preferred embodiment, the metal substrates are such that they will not normally permit bulk permeation of gases through the metal itself. Electrodes made of such gas impermeable metal substrates include electrodes contemplated herein having a metal mesh substrate wherein the metal substrate itself is substantially gas impervious, although the gases may pass through the openings in the mesh of the electrode.

The support members may be in the form of a solid structural member or of a thin imperforate plate, for example, up to about ¼ inch thick. Alternatively, the support may be perforate or foraminous or mesh. They can be of any shape appropriate for anodes to be used in electrolytic cells. When anodes having perforate or foraminous supports are used in mercury cells, they may be totally or only partially immersed in the electrolyte. When totally immersed in the electrolyte, only the surface of the anode facing the flowing cathode need be coated with the spinel anodic surface, or all of the surfaces of the anode may be coated with the spinel anodic surface. Likewise, when such anodes having perforate or foraminous supports are used in diaphragm cells, either one surface or both surfaces of the support may be coated with the spinel anodic surface.

In most cases even the spinel is applied following the above procedure directly to an untreated valve metal metallic substrate, as commercial grade titanium metal, in the presence of oxygen, the voltage drop across the cell with such an anodic surface is very high—on the order of about 10 volts. This increased voltage appears to be caused by the formation of oxides of the metal used in fabricating the substrate at the spinel-substrate interface. While not wishing to be bound by this explanation, it is believed that either some actual oxidation of the unprotected bulk titanium or like metal takes place at the spinel-substrate interface or that there is some migration or intermetallic diffusion of oxygen atoms into the bulk metal, or possibly that the spinel itself may tend to oxidize the substrate.

According to this invention, this difficulty may be avoided by interposing between and in electrical contact with the metal substrate, e.g., titanium metal, and the outer spinel surface a layer which is more resistant to oxidation than is the titanium or like metal base and which itself is electroconductive, preferably at least as electroconductive as the titanium or like metal base itself.

Especially advantageous results are obtained when the interposed layer is itself resistant to anodic attack in the environment to which the electrode is to be exposed. Especially good results have been obtained by the application of an intervening layer of a platinum group metal, platinum group metal oxide, or mixtures thereof between the spinel and the titanium or like metal base to inhibit this oxidation and/or to prevent or minimize this undesirably high anode voltage drop. All the platinum group metals as ruthenium, rhodium, palladium, osmium, iridium, and platinum applied as an intermediate layer in the metallic state provide electrodes having lower voltages than in the case when the spinel is applied directly to the valve metal member. Such platinum group metals generally have an electrical conductivity of from about $10^5$ (ohm centimeters)$^{-1}$ to about $10^6$ (ohm centimeters)$^{-1}$. The oxides of the platinum group metals as ruthenium oxide, rhodium oxide, palladium oxide, osmium oxide, iridium oxide, and platinum oxide also are effective for this purpose, as are the sulfides thereof.

This intervening layer may be provided by a mixture of oxides of platinum group metals of the second transition series as ruthenium, rhodium, and palladium with oxides of platinum group metals of the third transition series as osmium, iridium, and platinum. Such specific oxide mixtures include ruthenium oxide and osmium oxide, ruthenium oxide and iridium oxide, ruthenium oxide and platinum oxide, rhodium oxide and osmium oxide, rhodium oxide and iridium oxide, rhodium oxide and platinum oxide, palladium oxide and osmium oxide, palladium oxide and iridium oxide, and palladium oxide and platinum oxide.

This intervening layer may also be provided by a mixture of oxides of platinum group metals of the second transition series, with platinum group metals of the third transition series. Such specific mixtures include ruthenium oxide-osmium, ruthenium oxide-iridium, ruthenium oxide-platinum, rhodium oxide-osmium, rhodium oxde-iridium, rhodium oxide-platinum, palladium oxide-osmium, palladium oxide-iridium and palladium oxide-platinum.

Good results are also obtained with alloys or mixtures of the platinum group metals of the second transition series with alloys of platinum group metals of the third transition series such as alloys or mixtures of ruthenium and osmium, ruthenium and iridium, ruthenium and platinum, rhodium and osmium, rhodium and iridium, rhodium and platinum, palladium and osmium, palladium and iridium, palladium and platinum. Additionally, good results are also obtained with mixtures or alloys of the platinum group metals.

The intervening layer may also be provided by an alloy of the metal used in fabricating the substrate (i.e., a valve metal such as titanium) with a metal of the platinum group as, for example, titanium alloyed with one or more of the following: ruthenium, rhodium, palladium, osmium, iridium, or platinum.

In preparing electrodes according to this embodiment in which a protective, conductive layer is placed between the substrate and the spinel, typically the titanium or like substrate is first etched or otherwise treated to remove the naturally-occurring oxide coating, typically with hydrofluoric and hydrochloric acids. It is then coated with a metal of the platinum group. In one embodiment the metallic substrate member is coated with a solution of a compound of a platinum group metal. The compound should be readily thermally decomposable and yield, as products of decomposition, volatiles and either the metal or an oxide of the metal. Typically used are carbonates, chlorides, formates, nitrates, oxides, oxalates, and resinates of the platinum group metals such as platinum resinate. Alternatively, the oxidation-inhibiting coating of the platinum group metal may be electrodeposited onto the structural member. While still another embodiment of this invention, the platinum group metal may be clad to the structural member sprayed on the substrate, or even roller coated as a molten metal thereupon.

It is not necessary to apply pure platinum to the substrate since oxidation and corrosion-resistant alloys or mixtures of platinum such as platinum-iridium, platinum-osmium, or like alloys or mixtures may be applied. Moreover, mixtures or alloys of platinum group metals and/or their oxides and other materials, notably other metals or their oxides, may be applied. For example, the coating may comprise mixtures or alloys of: platinum and chromium, nickel, or cobalt in the metallic state, or mixtures of alloys of these non-precious metals with other platinum group metals, e.g., iridium, osmium, or the like. Also, platinum group metals mixed with corrosion-resistant oxides of metals such as the oxides of titanium, silicon, tungsten, chromium, nickel, cobalt, or vanadium. These may be applied simply by adding a resinate of the desired non-precious metal to the platinum resinate and following the procedures of Example I hereinafter. A mixture of platinum metal and ruthenium oxide may be applied by applying a mixture of their resinates according to such example. Similarly, the mixtures of platinum metal oxides and the non-precious metal oxides may be provided as an intermediate layer by applying a mixture of precious metal resinate and the resinate of the non-precious metal to the titanium coupon of Example I in lieu of the platinum resinate. As a general rule, the intervening layer or undercoat should contain at least 40 percent to 50 percent by weight of the platinum group metal and/or oxide thereof.

The actual effect of the platinum group metal is not clearly understood; and it is not certain that it functions as an actual physical protection of the member. Rather, it appears to be a chemical or oxidation-inhibiting effect; that is, it appears to make the substrate less receptive to either actual oxidation or to the migration of oxygen.

Very thin layers of the protective layer, e.g., platinum group metal oxide, are effective. Satisfactory results have been achieved with the application of only three coats of a platinum resinate prior to applying the spinel. X-ray data indicate that the platinum group metal coatings of thicknesses from about 1 or 2 to about 10 micro-inches are sufficient to give the desired result. By way of comparison, 10 micro-inches of platinum do not produce a satisfactory platinized titanium electrode where the platinum itself is the electrolyzing surface; a fairly-thick, uniform platinum layer of greater than about 20 micro-inches being required in that case.

Alternatively, the intermediate coating may be applied by inserting the previously-etched titanium or like metal member in a bath of electroconductive organic solvent and a compound of a platinum group metal. The titanium or like metal member may then be used as a cathode for the cathodic electrodeposition of the platinum group metal onto said titanium or like metal base cathode.

The platinum group metal compound may be present in the organic electrolyte as a solute or, alternatively, may be present in the form of small globules. After receiving the intermediate protective layer of platinum group metal or the like, the member is ready to receive a spinel coating.

While the spinel coating may be applied with effective results according to the methods described previously, in a general manner, other methods may also be resorted to. Thus, the spinel, in the form of a fine powder, may be pressed onto the substrate. Thereafter, the substrate with the powder coating is subjected to a compressive force. The compressive force is in excess of one ton per square inch, and, typically, on the order of about 10 to 20 tons per square inch. Such forces may be obtained conveniently by passing the structural member with the finely-powdered spinel thereon between rollers held in compression. By this procedure, a compressive point force in excess of two tons per square inch may be applied to the finely-powdered spinel and the substrate.

According to a further embodiment, the titanium or like metal base cleaned of oxide may be disposed as a cathode in an aqueous or electroconductive non-aqueous suspension of spinel powder with or without titanium oxide, or hydroxide, or aluminum hydroxide, or titanium resinate, and globules of a binder which migrates upon imposition of an electromotive force between a pair of electrodes to the cathode substantially as described in Ranney, Electrodeposition and Radiation Curing of Coatings, Hayes Data Corp., Park Ridge, N.J. (1970), pp. 101–109, to form a coating. This process is effective to produce a spinel coating of lower porosity. Furthermore thicker coatings may be applied in a single coating operation. The substrate may then be heated to volatilize or burn up the organics and bond the oxide to the base described above. By maintaining the cleaned titanium member cathodic during the entire period that the titanium is in contact with the electrolyte and until the coating is deposited, the intervening layers of platinum or the like may be dispensed with, although even in this case recourse to the intervening platinum or like layer is desirable.

In another embodiment, an alloy of two or three metals of the spinel may be electrodeposited directly upon a titanium substrate or upon a platinum or like coating on the substrate. The alloy coating which preferably should contain the metals substantially in the proportion of the spinel may then be heated in oxygen to oxidize the surface and to thereby form the spinel.

While the invention has been particularly described with reference to a titanium substrate which serves as the electroconductive base, it is to be understood that other materials may be used for the substrate. For example, the spinel coating may be applied to a graphite base having the contour of the desired anode. The graphite, if desired, may first be coated with the platinum interlayer as described above before applying the spinel coating. Moreover, the electrode base may be steel or other electroconductive base clad with a thin sheet or coating of titanium and in electrical contact therewith. The titanium coating or sheet may thus be coated with a spinel or with the platinum type interlayer and then with the spinel. While an interlayer of platinum group metal or an oxide of a platinum group metal is especially valuable because such materials are themselves resistant to anodic corrosion and have good electroconductivity and low overvoltage, other materials also may be used. As an example, the following electroconductive materials may be deposited upon the titanium or like chemically-resistant base with the spinel deposited on the coating of these materials: sulfides of platinum group metals, calcium ruthenate, titanium hydride, zirconium hydride, metallic nickel or a cobalt or chromium, or corrosion-resistant alloy of chromium.

In still another exemplification of this invention, the spinel coating may be applied upon an electroconductive titanium hydride substrate. Such titanium hydride substrates may be prepared by powder metallurgy techniques, or by chemical reaction of the titanium. When a titanium hydride member is used as the electroconductive substrate, the spinel outer surface may be applied by any of the methods described above, as decomposition of an organic liquid containing the ground up spinel, or electroless deposition, or cathodic electrodeposition. When a titanium hydride substrate is used, the spinel may be applied directly to the surface of the titanium hydride substrate. Alternatively, an oxidation-inhibiting layer as described above, comprising a metal of the platinum group, an oxide of a metal of the platinum group, or an alloy thereof, may be interposed between the hydride and the spinel.

A platinum group metal compound or the platinum group metal compounds may be applied simultaneously with the spinel to provide an outer surface comprising both the spinel and the platinum metal or oxide. In such a case, the spinel is generally in excess of the platinum group metal on an atomic basis.

When graphite is to be coated, the solvent should be easily volatilized and the platinum group metal or metal compound if applied should be thermally decomposable at a relatively low temperature, e.g., 200° C. to 500° C. to yield the metal and volatiles. Thus, the electrode may then have the spinel coating applied either directly to the graphite or on the platinum group metal or platinum group metal oxide sublayer interposed between it and the graphite as described above.

As explained hereinbefore, the preferred spinel usually is applied together with a binding agent. These agents include organometallic compounds which, on heating, decompose to the metal or metal oxide and volatiles as well as more permanent binders.

Typically, regardless of the substrate, the spinel must be made to adhere to the substrate. This may be accomplished by providing a lattice or network within the spinel, with a suitable permanent binding agent, whereby the adherence of the spinel to the substrate is enhanced.

A suitable permanent binding agent has to be impervious to the chlorine environment of the electrolytic cell as for instance a metal compound, such as an oxide, sulfide, nitride, boride, or carbide of titanium, tantalum, niobium, aluminum, bismuth, tungsten, zirconium, hafnium, vanadium, chromium, or silicon. It has been found that particularly good binding results are obtained by the formation, in situ with the spinel coating, of a metal oxide that is substantially non-reactive with the anolyte. The formation of this oxide, in situ, must, morever, take place at a temperature below the temperature at which any appreciable oxidation of the structural member occurs or any adverse effect on the undercoat occurs. For this reason, the thermal decomposition of a readily decomposed compound having volatile decomposition products as, for instance, an oxylate, carbonate, hydroxide, hydrated oxide, or resinate of titanium, tantalum, silicon, molybdenum, aluminum, bismuth, zirconium, hafnium, tungsten, niobium, or vanadium may be used. Generally the more permanent binders are inorganic. Titanium compounds are preferred. Whenever titanium dioxide is described as a binding agent, it will be understood that other binding agents as herein described may be used in lieu of or in addition thereto.

Small concentrations of the permanent binding agent are effective. Satisfactory results in terms of activity of the anode and the durability thereof have been obtained as titanium dioxide concentrations of from about 3.5 percent by weight (calculated as titanium metal) of the spinel surface coating to about 30 percent by weight (calculated as titanium metal) of the surface coating. Although it is possible to prepare electrodes using less than about 3.5 weight percent of the binding agent in the surface coating, spinel losses will be significant. With too great a concentration of a binding agent such as titanium dioxide, i.e., amounts above 30 weight percent of the surface coating (calculated as the metal), the anode activity will be influenced materially by the titanium dioxide. Titanium dioxide concentrations of from about 7 weight percent (calculated as titanium metal) to about 15 weight percent (calculated as titanium metal) are preferred.

In order to effectuate intimate mixing of the spinel and the permanent binder, both are put into a liquid medium. Either water or an organic solvent may be used. It is particularly important that the binding agent be dispersed in the liquid medium and that the spinel be in a fine enough state of subdivision that it is also readily dispersed in the liquid medium. Saturated aliphatic and aromatic liquid hydrocarbons yield satisfactory results. Better results are obtained with saturated aliphatic and aromatic liquid hydrocarbons having from 6 to 10 carbon atoms, as benzene, toluene, cumene, hexane, and cyclohexane. Toluene is preferred.

In one exemplification the spinel surface coating containing titanium dioxide binder is provided by applying a slurry of the spinel ground to minus 325 mesh and containing titanium resinate. Specifically, such a slurry is prepared by adding 0.5 gram of ground spinel to 3.0 grams of toluene and 1 gram of titanium resinate solution (containing 4.2 weight percent of titanium calculated as metal). This is vigorously stirred, providing a suspension which will not settle out for a period of from about 30 seconds to about 1 minute. Within this period and while the suspension still exists it is brushed onto the substrate which is then heated to a temperature of about 500° C. A plurality of such brushings and subsequent heatings are performed until the spinel content is built up to the desired thickness, usually the process of brushing and heating being repeated by about 7 to about 20 times. It is to be understood that satisfactory results may also be obtained without heating after every coat of spinel so long as the resinate is ultimately decomposed. The resulting surface, on the order of about 200 to about 400 micro-inches thick, has on the order of about 0.02 to about 0.04 gram of spinel per square inch of spinel coated anode surface. Thicker coatings, rarely in excess of about 500 micro-inches in thickness, may also be applied in this manner.

The spinel surface, applied with a permanent binding agent, as described above, is relatively thin—on the order of about 100 micro-inches to about 500 micro-inches—and subject to abrasion. For these reasons, physical protection of the spinel surface during, for example, shipment, storage, or installation, may be affected by the use of a compatible, water-soluble, polymeric protecting coating.

Natural proteins, agar-agar, and gelatin, among others, function acceptably in this capacity. A commercial polymer, such as Stein-Hall "F–3" (T.M.), an anionic, water-soluble polymer, dispersed in water, gives a satisfactory protective coating.

The amount of polymer required is only enough to give a protective coating, typically from about one half a gram of polymer per square foot of anode surface to about two grams of polymer per square foot of anode surface. The protective coating is completely dissolved after several minutes' contact with the electrolyte.

In still another embodiment of this invention, the spinel is dispersed in a fluxing agent prior to being applied to the structural member, thereby providing a more durable coating.

The fluxing agent should have a normal melting point, of from about 700° C. to about 800° C. The fluxing agent should also be resistant to the anolyte environment of the alkali-chlorine electrolytic cell. Glass frits slurried in water solution may be used.

Frits having a melting point in the desired range are generally comprised of mixed oxides and silicates of lead, potassium, zinc, boron, calcium, aluminum, and barium. They typically have from about 70 weight percent to about 80 weight percent lead oxides, about 1 weight percent silica, 10 to 16 weight percent zinc oxide, and about 10 weight percent boron oxide. The silica is present in the form of silicates. Various other compounds, as bismuth oxide, tin oxide, selenium oxide, tellurium oxide, and titanium dioxide may also be present in the frit.

The fluxing agent is ground to minus 325 mesh and slurried; typically, using water as the liquid. The ground frit constitutes from about 60 to about 80 weight percent of the slurry. The spinel, ground to minus 325 mesh, is added to the slurry such that there is from 1.5 to 7 parts of spinel to 1 part of fluxing agent by weight. Better results are obtained when there is from 2 to 4 parts of spinel to 1 part of fluxing agent by weight.

This slurry is applied to a substrate which typically has been etched and thereafter provided with a protective sublayer (as by being treated with a compound of a platinum group metal as described previously). The member is heated to the melting point of the flux and held at that temperature for a short time—typically from about 1 to about 10 minutes.

Alternatively, the platinum group metal or compound, preferably in the form of an oxide may be applied with a fluxing agent, and the spinel-flux coating may be applied above the platinum group metal-flux or platinum group metal oxide-flux coating. In still another variation of this exemplification, the platinum group metal or metal oxide is dispersed in the spinel-flux coating as well.

The following specific examples are illustrative:

EXAMPLE I

A cobalt-aluminate electrode was prepared as follows:

A titanium metal coupon, 6 inches long by ⅜ inch wide by ¹⁄₁₆ inch thick, was scrubbed with household cleanser and rinsed with distilled water and then with acetone. The coupon was then dipped in a one weight percent aqueous solution of hydrogen fluoride at room temperature, for 1 minute. The coupon was then etched by dipping in a 37 percent by weight hydrochloric acid solution at a temperature between 45° C. and 55° C. for 2½ hours. After etching in the hydrochloric acid solution, the coupon was immersed in running distilled water for 2 minutes and dried in air.

A platinum resinate solution was then brushed onto one side of the coupon. The solution was prepared by mixing 30 grams of "Engelhard 05–X" (T.M.) platinum resinate (containing 7.5 weight percent platinum calculated as metallic platinum) with 27 grams of toluene to yield a solution having a platinum content of 4 percent platinum by weight calculated as metallic platinum. Four coats of platinum resinate were successively applied to one side of the coupon in this manner. After each of coats 1 and 2 the coupon was heated at a rate of 50° C. per 5 minutes to a temperature of 400° C., and then maintained at 400° C. for 10 minutes. After each of coats 3 and 4, the coupon was heated at a rate of 50° C. per 5 minutes to a temperature of 500° C., and maintained at 500° C. for 10 minutes. This heating was in air.

The cobalt-aluminate spinel was prepared by individually grinding 2.067 grams of CoO and 2.811 grams of $Al_2O_3$ to minus 200 mesh. The powders were then mixed and placed in an alundum crucible. The crucible was heated in a furnace open to the atmosphere to a temperature of 1200° C. for 24 hours and then heated in the same furnace to a temperature of 1300° C. for 24 hours.

The resulting product, having the same X-ray diffraction pattern as that reported in the literature for the cobalt-aluminate spinel, was then removed from the crucible and ground to minus 325 mesh. One-half (0.5) gram of this spinel was placed in a container. To this spinel in the container was added 3.0 grams of toluene, and 1.0 gram of titanium resinate (4.2 weight percent titanium calculated as metallic titanium) to serve as a binder. The resulting slurry was stirred vigorously, thereby providing a suspension which did not settle out for a period of about 30 seconds to about 1 minute. Within this period and while the suspension remained, a brush was thoroughly wetted with the slurry and brushed onto the platinized surface of the coupon. The slurry was applied with a brush stroke in one direction and smoothed with a brush stroke in a direction perpendicular to the direction of application.

After each coat, the coupon was placed in a furnace open to the atmosphere, with the spinel surface being horizontal, and heated by raising the temperature at a rate of 50° C. per 5 minutes until the temperatures stated below were reached, whereupon the coupon was held at such temperature for 10 minutes. This procedure was repeated for all 11 coats, with the following ultimate temperatures being reached, respectively, for each of the 11 coats:

| Coat No. | Temperature, ° C. |
| --- | --- |
| 1 | 375 |
| 2 | 400 |
| 3 | 400 |
| 4 | 450 |
| 5 | 500 |
| 6 | 400 |
| 7 | 400 |
| 8 | 400 |
| 9 | 400 |
| 10 | 450 |
| 11 | 500 |

The resulting electrode had a coating of platinum about 8 micro-inches thick and a surface coating of cobalt-aluminum spinel composition about 200 to 400 micro-inches thick.

The electrode was utilized as the anode in a diaphragm cell. In this cell the cathode was an iron screen with a diaphragm thereon. The diaphragm was asbestos and was interposed between the anode and the cathode.

The electrolyte, a saturated solution of sodium chloride having a concentration of 310 grams per liter of sodium chloride, was added at a constant rate, and hydrogen, chlorine, and caustic soda were recovered. Electrolysis was conducted, imposing a voltage to produce a current density of 500 amperes per square foot of coated anodes surface, and yielding an electrolyte temperature of 90° C.

The initial cell voltage between the coupon and the cathode was 3.60 volts. After 15 days of continuous electrolysis, the cell voltage was 3.59 volts. The electrode was removed from the cell and subjected to X-ray measurement. A 7.2 percent decrease in coating thickness was determined by X-rays normal to the electrode surface.

The electrode was placed back into the laboratory diaphragm cell for further testing. The initial cell voltage was 3.67 volts (the initial cell voltage of a reference platinized titanium electrode was also 3.67 volts). After an additional 61 days of electrolysis at a current density of 500 amperes per square foot and an electrolyte temperature of 90° C., the cell voltage was 3.92 volts (the cell voltage of the platinized titanium reference electrode was 3.86 volts). The electrode was removed from the cell and rinsed in concentrated hydrochloric acid. X-rays normal to the electrode surface indicated a 5.8 percent decrease in coating thickness during this second period of electrolysis based on the thickness at the beginning of the second period.

The electrode was then placed back into the laboratory diaphragm cell and subjected to further electrolysis for an additional period of 71 days, providing a total of 147 days of electrolysis under the same conditions as before. The initial cell voltage was 3.25 volts, and the final cell voltage was 3.67 volts (compared with 3.31 volts and 3.43 volts, respectively, for another platinized titanium reference electrode). The electrode was removed from the cell and rinsed in running distilled water. X-ray thickness measurements made at approximately the same location on the coupon as the previous measurements indicated a 2.6 percent decrease in coating thickness during the third period of electrolysis, based on the coating thickness at the beginning of the third period.

The electrode was then placed back into the laboratory diaphragm cell and subjected to further electrolysis for an additional period of 63 days, providing a total of 210 days of electrolysis under the same conditions as before. The initial voltage was 3.17 volts and the final voltage was 3.35 volts (compared with 3.33 volts and 3.44 volts, respectively, for a platinized titanium reference electrode). The electrode was removed from the cell, rinsed with running distilled water, and X-rayed as described previously. At substantially the same location on the coupon, a coating thickness decrease of 1.6 percent during the fourth period of electrolysis, based on the coating thickness at the beginning of the fourth period, was observed.

EXAMPLES II TO XVIII

(I) PREPARATION OF THE SPINELS (A) Preparation of the spinels from the mixed oxides Cobalt-aluminate, copper-aluminate, and nickel-aluminate spinels were prepared from the mixed oxides. The general procedure was to grind stoichiometric amounts of the oxides to minus 200 mesh, mix the ground oxides together, place the mixed, ground oxides in a crucible, and heat the mixed, ground oxides.

Specifically, one sample of cobalt-aluminate was prepared by separately grinding 2.067 grams of CoO and 2.811 grams of $Al_2O_3$ to minus 200 mesh. The ground oxides were mixed together and placed in an alundum crucible. The ground, mixed oxides, in the alundum crucible, were placed in a furnace that was exposed to the atmosphere, and heated to a temperature of 1200° C. for 24 hours. The mixed oxides were thereafter heated to a temperature of 1300° C. for an additional 24 hours. The resulting product was deep blue in color and had the X-ray diffraction pattern reported in the literature to be characteristic of cobalt-aluminate spinel.

A second sample of cobalt-aluminate spinel was prepared from the mixed oxides. 42.4 grams of CoO were ground to minus 200 mesh. 57.6 grams of $Al_2O_3$ were ground to a particle size of 1 micron. The two ground oxides were mixed together and placed in an alundum crucible. The alundum crucible was placed in a furnace open to the atmosphere and heated to 1350° C. for 24 hours. The resulting product was deep blue in color and had the X-ray diffraction pattern reported in the literature to be characteristic of cobalt-aluminate spinel.

Its particle size was determined by a Model B Coulter Counter (manufactured by Coulter Electronics Co., Inc., Hialeah, Fla.). The use of this counter to determine the particle size of inorganic materials is described generally in Ceramic Age, July 1965, page 46, and Canadian Controls and Instrumentation, vol. 9, Number 4, (April 1970), page 64 and was described by O. A. Ullrich before the Instrument Society of America on Sept. 26, 1960. The standard operating procedure specified by the manufacturer was used. The diameter so determined was 18.43 microns. Whenever a Coulter Counter diameter is referred to herein, it will be understood to be a median diameter.

Its surface area was determined by the method of Brunauer, Emmett, and Teller, as described in the Journal of the American Chemical Society, volume 60, p. 309. The surface area, determined in this way, using nitrogen, was 3.2 square meters per gram.

Its ultimate particle size, as determined by electron microscope, was in the range of about 0.01 to about 0.1 microns, with half of the particles being under 0.1 microns. The permeable surface layer is a mass of contiguous spinel particles of this ultimate particle size and agglomerates thereof.

A third sample of cobalt-aluminate spinel was made. 42.4 grams of CoO were ground to minus 200 mesh and 57.6 grams of $Al_2O_3$ were ground to minus 200 mesh. The two ground oxides were mixed together and placed in an alundum crucible. The alundum crucible containing the two ground oxides was placed in a furnace open to the atmosphere. The ground oxides were then heated to 1350° C. for 24 hours. The resulting product was deep blue in color and had the X-ray diffraction pattern reported in the literature to be characteristic of cobalt aluminate spinel. The particle size determined by the Coulter Counter as hereinbefore described was 15.18 microns. The BET surface area determined as hereinbefore described was 1.4 square meters per gram.

Nickel-aluminate spinel was prepared from the mixed oxides. 2.303 grams of NiO and 3.143 grams $Al_2O_3$ were ground separately to minus 200 mesh. The ground oxides were mixed together and placed in an alundum crucible. The crucible containing the ground, mixed oxides was placed in a furnace open to the air, and heated to a temperature of 1200° C. for 24 hours. Thereafter, the mixed, ground oxides were heated to a temperature of 1300° C. for 24 hours. The resulting product was light blue and showed the X-ray diffraction pattern reported in the literature to be characteristic of nickel-aluminate spinel.

Copper-aluminate spinel was prepared from the mixed oxides as follows: 1.561 grams of CuO and 2.000 grams of $Al_2O_3$ were separately ground to minus 200 mesh. The ground oxides were mixed together and placed in an alundum crucible. The alundum crucible containing the mixed, ground oxides was placed in a furnace open to the air, and heated to a temperature of 1100° C. for 24 hours. The resulting product was brown in color and showed the X-ray diffraction pattern reported in the literature to be characteristic of copper-aluminate spinel.

(B) Preparation of the iron-aluminum spinel from the mixed oxides

The spinel having the formula $Fe^{II}(Fe^{III}Al)O_4$ was prepared from the mixed oxides $Fe_2O_3$, FeO, and $Al_2O_3$. This was carried out according to the following procedure:

(1) Preparation of FeO: FeO was prepared by heating metallic iron and $Fe_3O_4$ in the presence of water vapor. The reactions believed to be taking place are:

$$Fe+H_2O \rightarrow FeO+H_2$$

$$Fe_3O_4+H_2 \rightarrow 3FeO+H_2O$$

The procedure used is the procedure described in Blue and Claassen, Journal of the American Chemical Society, 71, 3839 (1949) and Couglin, King, and Bonnickson, Journal of the American Chemical Society, 73, 3891 (1951). Specifically, 7.8350 grams of $Fe_3O_4$ and 1.8899 grams of powdered metallic iron were placed in separate porcelain boats. The boats were placed in a silica tube fitted with a stopcock and a side arm containing a small amount of water. The apparatus was heated for 10 days at 900° C. At the conclusion of the 10-day heating period, the silica tube containing the two porcelain boats was removed from the furnace and quenched in ice water. The products were removed from the boats and examined by X-ray diffraction. Both products exhibited the X-ray diffraction pattern reported in the literature to be characteristic of FeO. The two powdered products were then combined.

(2) Preparation of a spinel from the oxides.—1.000 gram of the FeO prepared as described above, 1.0221 grams of $Fe_2O_3$, and 0.6524 gram of $Al_2O_3$, all ground to minus 200 mesh were mixed and placed in a silica tube. The tube was connected to a vacuum system and outgassed at 110° C. and $10^{-5}$ millimeters of mercury vacuum overnight. The tube was sealed off under vacuum and heated to 1200° C. for 24 hours. The resulting product was a black, magnetic material exhibiting the X-ray diffraction pattern reported in the literature to be characteristic of the $Fe^{II}(Fe^{III}Al)O_4$ spinel.

(C) Preparation of spinel from nitrate solution

Copper-aluminate, copper-chromite, copper-ferrite, cobalt-aluminate, cobalt-chromate spinels were prepared by precipitation from the nitrate solutions. The general procedure was to prepare an aqueous solution 0.5 molar in the nitrate salt of the divalent metal and 1.0 molar in the nitrate salt of the trivalent metal. This solution was evaporated to dryness by heating the solution to a temperature between 125° C. and 140° C. The dried product was then heated in an air-aspirated furnace to drive off the nitrogen compounds, yielding thereby a mixed oxide. The mixed oxide was ground to a powder which was then heated in a furnace to a temperature sufficiently high to form the spinel.

(1) Preparation of cobalt-aluminate from the nitrates.—An aqueous solution of 100 milliliters ,0.985 molar in cobalt nitrate, $Co(NO_3)_2$, and 0.196 molar in aluminum nitrate, $Al(NO_3)_3$ was prepared by dissolving appropriate amounts of the nitrates in distilled water. The solution was placed into a porcelain crucible and evaporated in an oven at a temperature of 125° C. for 4 hours. The materials were then heated in an oven at 145° C. for 24 hours. This was followed by heating in a furnace at 225° C. with air aspiration for 1 hour. Thereafter, the crucible was placed into a furnace and heated to 700° C. until brown fumes were evolved. Brown fumes were evolved for about 45 seconds. The temperature was then increased to between 800° C. and 825° C., and held at that temperature for 18 hours. After 18 hours at a temperature between 800° C. and 825° C. the crucible was removed from the furnace and cooled. The product was then removed from the crucible, ground with a mortar and pestle, and heated again in the furnace at a temperature between 800° C. and 825° C. for a period of 49 hours. X-ray diffraction analysis of the product showed it to have the X-ray diffraction pattern reported in the literature to be characteristic of cobalt-aluminate spinel.

(2) Preparation of copper-aluminate spinel from the nitrates.—An aqueous solution of 30 milliliters, 0.5 molar in copper nitrate, $Cu(NO_3)_2$, and 1.0 molar in aluminum nitrate, $Al(NO_3)_3$, was prepared by dissolving appropriate amounts of the respective nitrate salts in distilled water. The heating procedure described for cobalt-aluminate was followed, except that after the heating at a temperature between 800° C. and 825° C. for 49 hours, the material was further heated to a temperature between 800 °C. and 825° C. for an additional 42 hours. The resulting product showed the X-ray diffraction pattern reported in the literature to be characteristic of copper-aluminate spinel, $CuAl_2O_4$.

(3) Preparation of copper-ferrite spinel from the nitrates.—An aqueous solution of 30 milliliters, 0.5 molar in copper nitrate, $Cu(NO_3)_2$, and 1.0 molar in iron nitrate, $Fe(NO_3)_3$ was prepared by dissolving appropriate amounts of the respective nitrate salts in distilled water. The heating procedure described for cobalt-aluminate was followed. The resulting product showed the X-ray diffraction pattern reported in the literature to be characteristic of the copper-iron spinel, $CuFe_2O_4$.

(4) Preparation of copper-chromate spinel from the nitrates.—An aqueous solution of 30 milliliters, 0.5 molar in copper nitrate, $Cu(NO_3)_2$, and 1.0 molar in chromium nitrate, $Cr(NO_3)_3$ was prepared by dissolving appropriate amounts of the respective nitrate salts in distilled water. The heating procedure described for cobalt-aluminate was followed. The resulting product showed the X-ray diffraction pattern reported in the literature to be characteristic of copper-chromium spinel, $CuCr_2O_4$.

(5) Preparation of cobalt-chromate spinel from the nitrates.—30 milliliters of a solution 0.5 molar in cobalt-nitrate, $Co(NO_3)_2$, and 1.0 molar in chromium nitrate, $Cr(NO_3)_3$, was prepared. The solution was subjected to the heating procedure described above for cobalt-aluminate.

Three additional samples of cobalt-aluminate spinel were prepared by decomposition of the nitrates. In each sample 40.7 grams of $Co(NO_3)_2 \cdot 6H_2O$ and 105 grams of $Al(NO_3)_3 \cdot 9H_2O$ were dissolved in water. The resulting solutions were evaporated to dryness by the procedure described above. Thereafter the nitrates were heated to 800° C. and held there until brown fumes were no longer evolved, typically about 45 seconds to about 1 minute. The resulting materials were then fired in crucibles in air. One sample was fired in air at a temperature of 800° C. for 24 hours. The resulting product showed the characteristic dark blue color of cobalt-aluminate spinel and the X-ray diffraction pattern reported in the literature to be characteristic of cobalt-aluminate spinel. The BET surface area determined as hereinbefore described was 79.0 square meters per gram, and the Coulter Counter median diameter determined as hereinbefore described was 26.35 microns.

The second sample was heated in air at a temperature of 1000° C. for 24 hours. The resulting product had the dark blue color characteristic of cobalt-aluminate and showed the X-ray diffraction pattern reported in the literature to be characteristic of cobalt-aluminate spinel. The BET surface area determined as hereinbefore described was 12.3 square meters per gram and the Coulter Counter median diameter determined as hereinbefore described was 22.42 microns.

The third sample was heated in air at a temperature of 1200° C. for 24 hours. The resulting product had the characteristic dark blue color of cobalt-aluminate spinel and exhibited the X-ray diffraction pattern reported in the literature to be characteristic of cobalt-aluminate spinel. The BET surface are determined as hereinbefore described was 1.1 square meters per gram and the Coulter Counter median diameter determined as hereinbefore described was 23.46 microns.

(D) Precipitation from oxalate solution (1) Preparation of $MgFe_2O_4$ spinel.—A solution of 27 grams (0.225 moles) of $MgSO_4$ and 62 grams (0.407 moles) of $FeSO_4$ in two liters of distilled water was prepared. The solution was then filtered. The filtered solution was heated to boiling and 78 grams (0.632 mole) of ammonium oxalate and 2.3 grams (0.019 mole) of oxalic acid were added to the solution with stirring. Boiling and stirring were continued for two hours during which a precipitate appeared. The resulting precipitate was filtered on a glass filter and washed with 3 liters of distilled water. The washed precipitate was then dried in an oven exposed to the atmosphere at 105° C. for 3 hours. The product was then placed in a porcelain crucible and heated at a rate of 50° C. per 5 minutes to a temperature of 500° C. It was held at the temperature of 500° C. for 10 minutes and then cooled to room temperature over a 16-hour period. The resulting product was ground to minus 200 mesh and then heated to 950° C. and held at 950° C. for 7½ hours. The resulting product was subjected to X-ray diffraction and showed the X-ray diffraction pattern reported in the literature to be characteristic of the $MgFe_2O_4$ spinel.

(2) Preparation of $NiAl_2O_4$ spinel.—An analogous procedure was followed for the production of nickel aluminate, substituting nickel sulfate for magnesium sulfate, and aluminum sulfate for iron sulfate. The resulting product was subjected to X-ray diffraction and showed the X-ray diffraction pattern reported in the literature to be characteristic of the $NiAl_2O_4$ spinel.

(E) Preparation of spinels from chloride solution

Nickel chromate, nickel aluminate, cobalt aluminate, and copper chromate spinels were prepared by preciptiation from chloride solutions. The general procedure was to prepare a solution containing the chloride salts of the di- and tri-valent metals. To this soltuion was added ammonium carbonate. The solution was then stirred under a nitrogen blanket and the precipitate which formed was separated by centrifuging under a nitrogen atmosphere. The centrifugate was dried under a nitrogen atmosphere and the solid material ground to minus 100 mesh, placed in a porcelain crucible, and heated under vacuum for 72 hours.

(1) Cobalt-aluminate spinel by ammonium carbonate precipitation.—100 milliliters of a solution containing 0.27 gram of aluminum chloride, $AlCl_3$, and 49.3 milliliters of a solution containing 0.30 gram of cobalt chloride, $CoCl_2$, were mixed in a 300 milliliter, round-bottom flask, under a nitrogen blanket. To the solution was added 25 milliliters of a 10 weight percent solution of ammonium carbonate. The resulting mixture was stirred with a magnetic stirrer. A precipitate appeared which was separated by centrifuging under nitrogen. This precipitate was washed with distilled water and dried under nitrogen at 110° C. This solid material was then ground to minus 100 mesh in an agate mortar and placed in a covered porcelain crucible. The covered porcelain crucible containing the coprecipitated material was placed in a vacuum furnace under a vacuum of $10^{-5}$ millimeters of mercury and heated to a temperature of between 700° C. and 800° C. for a period of 16 hours. The material was then heated again for a period of 16 hours at a temperature of 1200° C. in a vacuum of $10^{-5}$ millimeters of mercury. The resulting product was deep blue in color and had the X-ray diffraction pattern reported in the literature to be characteristic of cobalt aluminate spinel, $CoAl_2O_4$.

The same procedure was followed for the preparation of nickel chromate spinel, except that chromium chloride, $CrCl_3$, was substituted for the aluminum chloride, $AlCl_3$, and nickel chloride, $NiCl_2$, was substituted for cobalt chloride, $CoCl_2$. The heating was to a temperature of 800° C. for 72 hours. The resulting product had the same X-ray diffraction as that reported in the literature for nickel-chromate spinel, $NiCr_2O_4$.

The procedure hereinbefore described for cobalt aluminate was followed for the preparation of nickel aluminate spinel except that nickel chloride, $NiCl_2$, was substituted for cobalt chloride, $CoCl_2$, and the heating was to a temperature of 900° C. for 72 hours. The resulting product had the X-ray diffraction pattern reported in the literature as being characteristic of nickel-aluminate spinel, $NiAl_2O_4$.

The procedure hereinbefore described for cobalt aluminate was followed for the preparation of copper chromate spinel, except that copper chloride, $CuCl_2$, was substituted for cobalt chloride, $CoCl_2$, and chromium chloride, $CrCl_3$, was substituted for aluminum chloride, $AlCl_3$, and the heating was to 1000° C. for 72 hours. The resulting product had the X-ray diffraction pattern reported in the literature as being characteristic of copper-chromium spinel, $CuCr_2O_4$.

(2) Preparation of a cobalt-aluminate spinel by ammonium hydroxide precipitation from chloride solution.—A solution was prepared from two solutions, one a solution of 100 milliliters containing 0.28 gram of aluminum chloride, $AlCl_3$, and the other a solution of 49.2 milliliters, containing 0.30 gram of cobalt chloride, $CoCl_2$. The solutions were mixed in a round-bottom flask under a nitrogen blanket. To this solution was added 10 milliliters of a concentrated (30 percent) solution of ammonium hydroxide. The resulting mixture was stirred with a magnetic stirrer and a precipitate appeared. The resulting precipitate was separated by centrifuging under a nitrogen blanket and dried under nitrogen at 110° C. The dried precipitate was ground in an agate mortar to minus 100 mesh and then placed in a covered porcelain crucible. The crucible containing the dried precipitate was placed in a vacuum furnace under a vacuum of $10^{-5}$ millimeters of mercury and heated. The material was heated to a temperature of 900° C. and maintained at 900° C. for 24 hours. A deep blue material was obtained which exhibited the X-ray diffraction pattern reported in the literature as being characteristic of cobalt-aluminate spinel $CoAl_2O_4$.

(II) PREPARATION OF TITANIUM COUPONS

Two sizes of titanium coupons—one size 2¾ inches long by 2 inches wide by 1/16 inch thick, and the other size 6 inches long by 3/8 inch wide by 1/16 inch thick—were utilized. Coupons of both sizes were scrubbed with household cleanser, rinsed with distilled water, and then with acetone. They were then dipped in a 1 percent hydrofluoric acid solution at room temperature for 1 minute. The coupons were then etched in a 37 percent hydrochloric acid solution. The etching temperature varied from 45° C. to 50° C. and the etching time varied from 1¾ hours to 3 hours. After etching in the hydrochloric acid solution, the coupons were immersed in running, distilled water for 2 minutes and then air dried.

Those coupons to be used in the mercury cell were 1½ inches long by 3/8 inch wide by 1/16 inch thick. Prior to any treatment a 6 inch by 3/8 inch by 1/16 inch coupon was bent at approximately a 90 degree angle one inch from the end to give one surface 3/8 inch by 1 inch, and then cut to size. This 3/8 inch by 1 inch surface was subjected to treatment as described above.

The 2¾ inches by 2 inches by 1/16 inch electrodes were utilized in the beaker chlorate cell. The 6 inches by 3/8 inch by 1/16 inch electrodes were utilized in the chlorine diaphragm cell.

(III) APPLICATION OF THE UNDERCOAT

A platinum resinate solution was used to obtain an undercoating on the cleaned and etched titanium coupons. The solution was prepared by mixing 30 grams of "Engelhard 05-X" (T.M.) platinum resinate (containing 7.5 weight percent platinum calculated as the metal) with 27 grams of toluene. This yielded a solution containing 4 weight percent platinum calculated as the metal. The coats of platinum resinate solution were brushed onto one side of the coupon. After each coat of platinum resinate solution was brushed on, the coupon was heated according to the following schedule:

Coat 1 and all subsequent coats except the last coat were heated at a rate of 50° C. per 5 minutes to a temperature of 400° C. for 10 minutes.

The final coat was heated at a rate of 50° C. per 5 minutes to a temperature of 500° C. and maintained at 500° C. for 10 minutes.

(IV) APPLICATION OF THE SPINEL

The spinel was ground to minus 325 mesh. To 0.5 gram of the ground spinel were added 3.0 grams of toluene. To this was added sufficient titanium resinate solution (having a titanium content of 4.2 weight percent titanium calculated as metallic titanium) to yield the titanium percentage shown in column 4, binder, of Table 1. This was vigorously stirred, providing a suspension which did not settle off for a period of from about 30 seconds to about 1 minute. Within this period and while the suspension still existed, it was brushed onto the coupon. After each coat, the coupon was heated at the rate of 50° C. per 5 minutes to the temperature indicated in the following table and maintained at that temperature for 10 minutes, The temperatures used for each coat were:

| Coat number: | Temperature, ° C. |
|---|---|
| 1 | 400 |
| 2 | 400 |
| 3 | 400 |
| 4 | 450 |
| 5 | 500 |
| 6 | 400 |
| 7 | 400 |
| 8 | 400 |
| 9 | 400 |
| 10 | 450 |
| 11 | 500 |

This procedure resulted in a spinel coating composition on the surface of the coupon of from about 0.02 gram per square inch of surface to about 0.03 gram per square inch of surface, and a total coating thickness of about 400 micro-inches (IV) TESTING OF THE ELECTRODE Three types of electrolytic cells were utilized in Examples II through XXII, the details of which are listed in Table I below. The chlorate cell was a 1500 milliliter beaker. The beaker contained a 300 grams/liter solution of sodium chloride at a temperature of 45° C. to 55° C. The cathode of the cell was platinized titanium having the same surface area as the anode under test. Except as indicated otherwise in Table I, electrolysis was usually conducted at a current density of 500 amperes per square foot based on the surface of the anode under test, producing sodium chlorate. The cell was periodically replenished with sodium chloride.

The second type of cell utilized was a laboratory diaphragm chlorine cell. In this cell the cathode was an iron screen with a diaphragm wrapped around it. The diaphragm was wrapped asbestos and was disposed between the spinel-coated anode surface and the cathode. The electrolyte, a saturated solution of sodium chloride having a concentration of 310 grams/liter of sodium chloride, was added at a constant rate, and hydrogen, chlorine, and caustic soda were recovered at a constant rate. Electrolysis was conducted at a current density of 250–500 amperes per square foot. In this diaphragm cell the anode under test was connected in parallel with a platinized titanium anode utilized as a standard. This served as a correction for diaphragm effects.

The third type of cell was a laboratory mercury cell. This cell was a glass container having an electrical contact in the bottom making contact with a channel ¾ inch wide and 9/16 inch deep containing mercury. The electrolyte was a solution of sodium chloride at a concentration of 300 grams per liter and a temperature of 90° C. The anode to be tested was positioned ⅛ inch above the mercury and contacted with the mercury 10 times during the course of an experiment. The duration of the contact was 1 minute. One hour was allowed between contacts.

In each of the above cells an external voltage was imposed between the anode and the cathode to generate the anode current density stated in Table I.

The results of the test are shown in Table I where the number of coats indicated in parenthesis in the column headed Undercoat indicates the number of coats of the platinum group metal that have been brushed onto the coupon in the method described hereinbefore. The column headed Binder indicates the oxide believed to be in the surface coating as a result of the thermal decomposition of a compound of the material indicated therein. The number in the brackets is the weight percent of the binder calculated as the metal. In the column headed Spinel, the first term in brackets indicates the procedure used as described hereinabove in forming the spinel. For example, when the term "oxides" appears between the brackets, it indicates that the spinel was one that was prepared by the procedure described in (A) "Preparation of the Spinels from the Mixed Oxides" or procedure (B) relating to $FeAlFeO_4$. When the term "Nitrates" appears in the brackets, the spinel was one that was prepared by the procedure described in (C) "Preparation of the Spinel from Nitrate Solution." When the term "oxalate" appears in the brackets, the spinel was one that was prepared by the procedure described in (E)–(1) for ammonium carbonate precipitation from chloride solution. Whenever the term "Hydroxide" appears in the brackets, the spinel was one that was prepared by the ammonium hydroxide method described in (E)–(2) for hydroxide precipitation from chloride solutions. In the column headed Spinel, the number in the second brackets is the weight percent of spinel in the coating, calculated as the metals.

The column headed Current Density indicates the current density in amperes per square foot of anode surface, i.e., spinel surface. The column headed Percent Loss of Surface indicates the percentage increase in counts per second of X-rays directed normal to the surface of the electrode after electrolysis.

EXAMPLE XIX

After 20 hours of electrolysis in the beaker chlorate cell, the electrode of Example III of Table I was removed therefrom. At the time the electrode was removed from the beaker chlorate cell, the cell voltage was 5.05 volts. The electrode was heated at a pressure of $10^{-5}$ millimeters of mercury for one half hour at a temperature of 750° C. to regenerate the electrode. It was thereafter heated at a pressure of $10^{-5}$ millimeters of mercury and at a temperature of 800° C. for one hour. The electrode was then reinserted in the beaker chlorate cell and utilized as an anode. The initial cell voltgae, at a current density of 500 amperes per square foot of coated anode surface, was 4.15 volts.

EXAMPLE XX

An anode was prepared having a spinel-glass coating on one face of a ⅜ inch by 6 inch titanium metal coupon. The cobalt aluminate spinel, $CoAl_2O_4$, had been prepared from the oxides as hereinbefore described. Amaco Metal Enamel, glass frit liquid flux was used as a binder for $CoAl_2O_4$ spinel. The following mixture was prepared: 0.86 gram of liquid flux (0.6 gram solids, minus 80 mesh, 1.4 grams $CoAl_2O_4$ spinel, minus 325 mesh), and 5 milliliters of distilled water, making a 70 weight percent loading of spinel. The mixture, a slurry, was then milled to further reduce the particle size of the glass. The mixture was applied to a titanium coupon that had been precoated with 5 coats of Engelhard "05–X" (trademark) platinum resinate solution as hereinbefore described. The glass-spinel mixture was applied by means of an eye dropper. The coupon was dried in an oven at 90° C. for ¾ hour and fired at a temperature of 704° C. to 745° C. for 5 minutes. A second coat of 50 percent Amaco Liquid Flux was applied and the coupon was heated at 705° C. to 745° C. for 5 minutes. The electrode surface was tough and glassy looking. The surface of the electrode was lightly sanded and the electrode was tested as an anode in the chlorate cell as hereinbefore described. The cell voltage was 5.5 volts at 500 amperes per square foot of coated anode surface.

EXAMPLE XXI

An electrode was prepared by applying a mixture containing 1 gram $CoAl_2O_4$ spinel prepared from the oxides as hereinbefore described, 8.2 grams titanium resinate solution containing .35 gram of titanium calculated as the metal, 0.092 gram platinum resinate solution containing .0069 gram of platinum calculated as the metal, and 0.7 gram of toluene to one face of a 2 inch by 3¾ inches by 1/16 inch graphite coupon. Eleven coats were applied. The coupon was heated at the rate of 50 degrees centigrade per

TABLE I

| Example | Substrate | Undercoat | Binder [1] | Spinel [1] | Current density (amps/ft.²) | Cell | Voltage— Initial | Voltage— Final | Time (hours) | Percent loss of surface |
|---|---|---|---|---|---|---|---|---|---|---|
| II | Ti | Pt (4 coats) | $TiO_2$ (12%) | $CoAl_2O_4$ (oxides) (88%) | 500 | Chlorate | 3.38 | 3.58 | 338 | Nil |
| III | Ti | Pt (1 coat) | $TiO_2$ (12%) | do | 500 | do | 4.0 | 5.05 | 20 | 10 |
| IV | Ti | Pt (3 coats) | $SiO_2$ (23%) | $CoAl_2O_4$ (oxides) (77%) | 500 | do | 3.6 | 3.75 | 170 | 30 |
| V | Ti | do | $NbO_2$ (19%) | $CoAl_2O_4$ (oxides) (81%) | 500 | do | 3.8 | 4.55 | 118 | 10 |
| VI | Ti | do | $TiO_2$ (12%) | $NiAl_2O_4$ (oxalates) (88%) | 250 | Diaphragm | 3.65 | [2] 3.99 | 3,600 | Nil |
| VII | Ti | do | $TiO_2$ (12%) | $NiAl_2O_4$ (carbonates) (88%) | 500 | Chlorate | 3.25 | 3.45 | 336 | 9 |
| VIII | Ti | Pt (4 coats) | $TiO_2$ (12%) | $NiAl_2O_4$ (oxides) (88%) | 500 | do | 3.15 | 3.25 | 360 | 4 |
| IX | Ti | Pt (3 coats) | $TiO_2$ (12%) | $NiAl_2O_4$ [3] (88%) | 250 | Diaphragm | 3.85 | [4] 5.64 | 1,656 | 14 |
| X | Ti | do | $TiO_2$ (12%) | $CuCr_2O_4$ (nitrates) (88%) | 500 | Chlorate | 3.4 | 3.8 | 240 | Nil |
| XI | Ti | do | $TiO_2$ (6.5%) | $CoFe_2O_4$ [5] (93.5%) | 500 | do | 4.05 | 4.65 | 215 | 12 |
| XII | Ti | do | $TiO_2$ (12%) | $CuAl_2O_4$ (nitrates) (88%) | 500 | do | 3.35 | 3.45 | 240 | 13 |
| XIII | Ti | do | $TiO_2$ (12%) | $CuAl_2O_4$ (oxides) (88%) | 500 | do | 3.4 | 3.6 | 240 | 18 |
| XIV | Ti | do | $TiO$ (12%) | $FeAlFeO_4$ (oxides) (88%) | 500 | do | 3.3 | 3.52 | 336 | 14 |
| XV | Ti | do | $TiO_2$ (6.5%) | $FeAlFeO_4$ (oxides) (93.5%) | 500 | do | 3.95 | 4.4 | 170 | 7 |
| XVI | Ti | do | $TiO_2$ (6.5%) | $NiFe_2O_4$ [4] (93.5%) | 500 | do | 3.65 | 4.40 | 265 | 12 |
| XVII | Ti | do | $TiO_2$ (12%) | $NiAl_2O_4$ (oxides) (88%) | 500 | Mercury | 3.60 | 3.65 | 10 | 5 |
| XVIII | Ti | do | $TiO_2$ (12%) | $CoAl_2O_4$ (oxides) (88%) | 500 | do | 3.62 | 3.68 | 10 | 2 |

[1] Weight percentage in surface coating calculated as the metals.
[2] Voltage within .1 volt of platinized titanium reference electrode.
[3] Equal proportions of spinel prepared from oxides and spinel prepared from carbonates.
[4] Voltage within .1 volt of platinized titanium reference electrode, until leads corroded.
[5] Commercially obtained spinel, prepared from oxides.

five minutes to the temperatures indicated and held at the temperature indicated for ten minutes:

| Coat No.: | Temperature (° C.) |
|---|---|
| 1 | 400 |
| 2 | 400 |
| 3 | 400 |
| 4 | 450 |
| 5 | 500 |
| 6 | 400 |
| 7 | 400 |
| 8 | 400 |
| 9 | 400 |
| 10 | 450 |

The coupon was heated to 500° C. for 35 minutes after the last coat. The back side of the electrode was masked with a titanium plate. The electrode was utilized as the anode in a beaker chlorate cell as hereinbefore described. The cell voltage was 3.35 volts at an anode current density of 300 amperes per square foot.

EXAMPLE XXII

An electrode was prepared by applying a mixture containing 1 gram $CoAl_2O_4$ spinel prepared from the oxides as hereinbefore described, 4.1 grams titanium resinate containing 4.2 weight percent titanium calculated as the metal and 4.25 grams of toluene to a 2 inch by 2¾ inches by 1/16 inch graphite coupon. Seven coats of the spinel mixture were applied to one face of the graphite coupon. After each coat, the coupon was heated at the rate of 50 degrees centigrade per five minutes to the temperature indicated, and maintained at the temperature for ten minutes:

| Coat No.: | Temperature (° C.) |
|---|---|
| 1 | 400 |
| 2 | 400 |
| 3 | 400 |
| 4 | 450 |
| 5 | 500 |
| 6 | 400 |
| 7 | 500 |

The back side of the coupon was masked with a titanium plate. The electrode was utilized as the anode in a beaker chlorate cell as hereinbefore described. The cell voltage was 3.38 volts at the current density of 300 amperes per square foot of spinel coated surface.

EXAMPLE XXIII

An electrode was prepared by sanding a commercially-obtained, previously platinized titanium metal coupon, ⅜ inch by 5 inches by 1/16 inch, down to bare metal.

An aqueous solution 0.4 molar in iron nitrate $Fe(NO_3)_3$ and 0.2 molar in nickel nitrate, $Ni(NO_3)_3$, was prepared. One drop of "Rohm and Haas Triton X-100" wetting agent was added to 10 milliliters of this solution. The solution was then brushed onto one face of the sanded coupon. The coupon was then heated slowly to red heat in an air-methane flame and kept at red heat for one minute. This produced a spinel coating. This coupon was then utilized as the anode in a beaker chlorate cell having a titanium cathode as hereinbefore described at a current density of 250 amperes per square foot. The initial cell voltage was 3.85 volts. After 7½ hours of electrolysis the cell voltage was 4.15 volts at a current density based on anode area of 250 amperes per square foot.

EXAMPLE XXIV

A strip of titanium metal foil ½ inch by 2½ inches was cleaned with household cleanser as described above for Examples II through XVIII and dried. One side of the strip was then coated with a solution 0.4 molar in iron nitrate, $Fe(NO_3)_3$, and 0.2 molar in cobalt nitrate, $Co(NO_3)_2$. The coated strip of foil was heated in a Bunsen burner flame at low flame for 5 seconds and at high flange for 1 minute. This was repeated successively for 5 coats. This resulted in a cobalt ferrite spinel $(CoFe_2O_4)$ coating on the titanium foil. The resulting electrode was utilized as an anode in the beaker chlorate cell, having a titanium cathode as hereinbefore described. At a current density of 150 amperes per square foot based on anode surface area the initial cell voltage was 5.8 volts.

EXAMPLE XXV

The procedure used in Example XXIV was followed except that nickel nitrate was substituted for the cobalt nitrate in the solution. The resulting electrode was utilized as the anode in a beaker chlorate cell as hereinbefore described at a current density of 100 amperes per square foot of anode surface. The initial cell voltage was 4.8 volts. After 5 hours, the cell voltage was 7.7 volts for the nickel ferrite ($NiFe_2O_4$) spinel coated electrode.

EXAMPLE XXVI

A magnesium ferrite spinel, $MgFe_2O_4$, anode was prepared on a 2 inches by 2¾ inches by 1/16 inch titanium metal coupon. The coupon was etched for 2½ hours in concentrated hydrochloric acid at a temperature between 38.5° C. and 60.5° C. The coupon was then rinsed and dried as hereinbefore described.

A slurry was prepared from 0.5 gram of magnesium ferrite ($MgFe_2O_4$) spinel ground to minus 325 mesh, 2.0 grams of toluene and 2.0 grams of titanium resinate containing 4.2 weight percent titanium calculated as the metal. Then coats of this slurry were applied to one face of the metal coupon by the application procedure set forth in IV—Application of the Spinel decribed in Examples II to XVIII. After each coating, the coupon was heated in a furnace that was open to the atmosphere, increasing the temperature 50° centigrade per 5 minutes. After each of coats 1 through 5, inclusive, the coupon was heated to 400° C. and maintained at this temperature for 10 minutes. After each of coats 6 through 9, inclusive, the coupon was heated at the rate of 50° centigrade per 5 minutes to a temperature of 500° C. and maintained at 500° C. for 10 minutes. After coat 10 the coupon was heated to 550° C. at the rate 50 degrees centigrade per five minutes to a temperature of 550° centrigrade and maintained at 550° centigrade for 10 minutes.

The resulting electrode having a magnesium ferrite ($MgFe_2O_4$) spinel surface was used as an anode in the beaker chlorate cell as hereinbefore described, with a titanium metal cathode. At a current density of 100 amperes per square foot of anode area, the cell voltage was initially 4.55 volts and increased to 5.25 volts after 400 hours of electrolysis.

EXAMPLE XXVII

A 2 inches by 2 inches by 1/16 inch titanium metal coupon was etched as described hereinabove. The coupon was then immersed in a solution made by dissolving 8.84 grams of palladium chloride ($PdCl_2$), 2.25 grams of ammonium chloride ($NH_4CL$) and 30 cubic centimeters of concentrated hydrochloric acid (HCl), in 200 cubic centimeters of distilled water. The coupon was made cathodic and subjected to a current of 7 amperes per square foot for 2 minutes to deposit a layer of palladium on the titanium metal coupon. It was then heated in air for one hour at 550° C. to oxidize the palladium layer.

The palladium oxide bearing titanium metal coupon was then coated with a slurry prepared from 0.5 gram of cobalt aluminate spinel ($CoAl_2O_4$), that had been prepared from the oxides as hereinbefore described, 0.5 gram DuPont "Ludox" (T.M.), (a 42.5 weight percent solution of $SiO_2$, particle size 100 to 150 micro-inches, in water, adjusted to a pH of 9), and 2 grams of distilled water. Ten coats were brushed onto one face of the coupon.

Coats 1 to 9, inclusive, were heated at a rate of 50° centigrade per 5 minutes to a temperature of 400° centigrade and held at 400° C. for 5 minutes. The tenth coat was heated at a rate of 50° C. per five minutes to 600° C. and held at 600° C. for 30 minutes, thereby depositing a cobalt aluminate surface on the coupon.

The resulting electrode was used as the anode of a beaker chlorate cell as hereinbefore described. It gave an initial cell voltage of 4.55 volts at a current density of 500 amperes per square foot.

The X-ray diffraction pattern of the anode produced according to this example is shown in FIG. 4. Particularly to be noted is the peak at 33.92 degrees two theta which is reported in the literature as corresponding to an oxide of palladium having the formula PdO.

EXAMPLE XXVIII

A 2 inches by 2 inches by $\frac{1}{16}$ inch titanium metal coupon was scrubbed with household cleanser, rinsed with distilled water, and then with acetone. The coupon was then dipped in a 1 percent hydrofluoric acid solution at room temperature for one minute. The coupon was then etched in hydrochloric acid for 19 hours. The coupon was then immersed in a plating solution prepared from 33 milliliters of a palladium chloride ($PdCl_2$) solution containing 7.4 grams of palladium chloride per 100 cubic centimeters solution, and 120 grams of potassium hydroxide (KOH) diluted to 500 milliliters with distilled water. The coupon was rendered cathodic and subjected to a current of 4.8 amperes per square foot for 5 minutes. The electroplated coupon was rinsed in water, then acetone, and dried at room temperature.

A solution made up of 5 grams of cobalt aluminate ($CoAl_2O_4$) spinel prepared from the oxides, 10 grams of titanium resinate containing 4.2 weight percent titanium calculated as the metal, and 30 grams of toluene was applied to the coupon. The individual coats were brushed onto one face of the coupon. After the application of coats 1 through 5 and 7 through 9, the coupon was heated at a rate of 50° C. per 5 minutes to a temperature of 400° C. for 10 minutes. Coats 6 and 10 were heated to a temperature of 500° C. for a period of 10 minutes, also at a rate of 50° C. for 5 minutes.

The resulting electrode which was made up of a titanium metal coupon substrate, an intermediate palladium-oxide layer and a cobalt aluminate spinel outer coating, was utilized as the anode in a beaker chlorate cell as hereinbefore described. At a temperature of 45° C. and a current density of 500 amperes per square foot, the initial voltage was 3.27 volts, and the voltage after 450 hours of electrolysis was 3.63 volts.

EXAMPLE XXIX

A coupon was prepared, etched, and electroplated in a palladium chloride (PdCl) solution according to Example XXVIII.

A cobalt aluminate ($CoAl_2O_4$) spinel solution was prepared according to Example XXVIII and applied to one face of the coupon by brushing. Coats 1 through 4 inclusive and 6 through 9 inclusive were heated at a rate of 50° C. per 5 minutes to a temperature of 400° C. and held at that temperature for 10 minutes. Coats 5 and 10 were heated at a rate of 50° C. per 5 minutes to a temperature of 500° C. and held at that temperature for 10 minutes. The resulting electrode was made up of a titanium metal substrate having an intermediate layer of palladium oxide, and an outer coating of cobalt aluminate spinel.

The electrode was then utilized as the anode in a beaker chlorate cell as hereinbefore described. At a current density 500 amperes per square foot and a temperature of 43.5° C., the initial voltage was 3.15 volts. After 413 hours of electrolysis, the voltage was 3.50 volts.

EXAMPLE XXX

A 2 inches by 2 inches by $\frac{1}{16}$ inch titanium coupon was scrubbed with houshold cleanser, rinsed with distilled water, and then rinsed with acetone. It was then dipped in a 1 percent hydrofluoric acid solution at room temperature for one minute. The coupon was then etched in a 37 percent hydrochloric acid solution.

The coupon was then immersed in a solution made up of 10 grams of ruthenium nitroso chloride, 21.5 grams of sulfuric acid, and sufficient distilled water to make 1 liter of solution. The coupon was made cathodic and subjected to a current density of 18 amperes per square foot for 8 minutes to electrodeposit a ruthenium layer on the titanium metal coupon.

The coupon was then coated with a solution prepared from 1 gram of cobalt aluminate ($CoAl_2O_4$) spinel prepared from the oxides, 2 grams of titanium resinate containing 4.2 weight percent of titanium calculated as the metal, and 6 grams of toluene. Five coats were brushed onto one face of the coupon. Coats 1 to 4, inclusive, were heated at a rate of 50° C. per 5 minutes to a temperature of 400° C. and maintained at 400° C. for 10 minutes. The fifth coat was heated at a rate of 50° C. per 5 minutes to a temperature of 550° C. and held at 550° C. for 15 minutes.

The resulting electrode having a titanium metal substrate, an intermediate ruthenium oxide layer, and a cobalt aluminate outer surface, was utilized as the anode in a beaker chlorate cell. It gave a cell voltage of 3.52 volts at a current density of 500 amperes per square foot and an electrolyte temperature of 45° C.

EXAMPLE XXXI

A 2 inches by 2 inches by $\frac{1}{16}$ inch titanium metal coupon was etched as described hereinabove. The coupon was then immersed in a solution made by dissolving 8.84 grams of palladium chloride ($PdCl_2$), 2.25 grams of ammonium chloride ($NH_4Cl$), and 30 cubic centimeters of concentrated hydrochloric acid (HCl) in 200 cubic centimeters of distilled water. The coupon was made cathodic and subjected to a current density of 14.4 amperes per square foot for 5 minutes, thereby depositing a layer of palladium metal on the surface of the titanium metal coupon.

The coupon was then heated under a vacuum of $3.7 \times 10^{-5}$ millimeters of mercury to 900 degrees centigrade for 30 minutes. The coupon was then cooled under vacuum to room temperature.

A solution made up of 2.0 grams of cobalt aluminate spinel ($CoAl_2O_4$) prepared from the oxides as hereinbefore described, 0.52 gram of titanium$^{(III)}$ chloride ($TiCl_3$), 17 grams of 15 weight percent hydrochloric acid (HCl), and 0.7 gram of 30 weight percent hydrogen peroxide ($CH_2O_2$). Ten coats of this solution were brushed onto the treated surface of the titanium metal coupon. After each coat was applied, the coupon was heated at the rate of 5 degrees centigrade per five minutes. After coats 1 through 9 inclusive, the coupon was heated to a temperature of 350 degrees centigrade. After the tenth coat was applied, the coupon was heated to 450° and maintained at 450 degrees centigrade for one hour.

The electrode was then subjected to X-ray diffraction analysis as hereinbefore described. It yielded the diffraction pattern shown in FIG. 5, having peaks at angles of 17.69 degrees two theta, 39.67 degrees two theta, 41.10 degrees two theta, and 74.68 degrees two theta. These peaks correspond to the peaks reported in the literature for an alloy of palladium and titanium having two atoms of titanium per atom of palladium.

The coupon was then utilized as the electrode in a beaker chlorate cell, as hereinbefore described. At a current density of 500 amperes per square foot of coated anode surface, and an electrolyte temperature of 43 degrees centigrade, the cell voltage was 3.40 volts after 90 hours of electrolysis and 3.45 volts after 305 hours of electrolysis.

Although this invention has been described with particular reference to anodes for electrolysis of aqueous alkali metal chloride solutions, it is not limited to such use. The anodes herein contemplated may be used in electro-chemical reactions wherever a corrosion-resistant anode or at least one having long life is desired. Thus, the electrolyte in the cell may be a salt of a metal which may be electrodeposited and this electrolyte electrolyzed between the spinel surface anode and a cathode to electrodeposit the metal on the cathode. Copper, nickel, iron, manganese, and the like may be so deposited in these salts. The electrolytic oxidation of organic compounds, e.g., propylene to propylene oxide or propylene glycol, may be performed using such anodes. Moreover, metal structures such as ships' hulls may be cathodically protected using these anodes. In each case, the cell comprises the spinel surface anode herein contemplated, a cathode, and means to establish an external voltage or electromotive force between the anode and cathode whereby the anode is positively charged with reference to the cathode.

It is to be understood that although the invention has been described with specific reference to specific details of particular embodiments thereof, it is not to be so limited since changes and alterations therein may be made which are within the full intended scope of this invention as defined by the appended claims.

I claim:

1. An electrode comprising:
   an impermeable, electroconductive, valve metal substrate; and
   an external permeable surface layer comprising particulate bimetal spinel wherein the spinel particles are contiguous and have an ultimate particle size of from 0.01 to 0.1 micron, and means for binding said particles to adjacent particles and for binding said layer to said substrate.

2. The electrode of claim 1 wherein the binding means comprises a binding agent chosen from the group consisting of borides, carbides, nitrides, oxides, and sulfides of tantalum, titanium, silicon, niobium, tungsten, molybdenum and vanadium.

3. The electrode of claim 1 wherein a water soluble, protective coating is provided on the permeable surface layer.

4. The electrode of claim 3 wherein the protective coating comprises a water soluble polymer.

5. The electrode of claim 1 wherein the bimetal spinel is chosen from the group consisting of $CoAl_2O_4$, $CoFe_2O_4$, $CuAl_2O_4$, $CuCo_2O_4$, $CuCr_2O_4$, $CuFe_2O_4$, $Fe^{II}AlFe^{III}O_4$, $MgFe_2O_4$, $NiAl_2O_4$, $NiFe_2O_4$, $NiCr_2O_4$, and mixtures thereof.

6. An electrode according to claim 1 wherein the electroconductive metal is titanium.

7. An electrode comprising:
   an impermeable, electroconductive valve metal substrate; and
   a surface thereon permitting the passage of current therethrough comprising a bimetal spinel and a binding agent chosen from the group consisting of borides, carbides, nitrides, oxides, and sulfides of tantalum, titanium, silicon, niobium, tungsten, molybdenum, and vanadium.

8. An electrode comprising:
   an electroconductive, electrolyte-impermeable valve metal substrate;
   an external surface layer comprising a bimetal spinel and an inorganic binder chosen from the group consisting of the borides, carbides, nitrides, oxides, and sulfides of tantalum, titanium, silicon, niobium, tungsten, molybdenum, and vanadium; and
   an intermediate layer comprising a material that is more electroconductive than the bimetal spinel, interposed between and in contact with the bimetal spinel surface and the substrate.

9. An electrode comprising:
   an impermeable, electroconductive, valve metal substrate;
   an external permeable surface layer comprising particulate bimetal spinel wherein the spinel particles are contiguous and have an ultimate particle size of from 0.01 to 0.1 micron;
   an intermediate layer comprising a material that is more electroconductive than the bimetal spinel, interposed between and in contact with the substrate and the external surface layer; and
   means for binding said particles to adjacent particles and for binding said surface layer to said intermediate layer.

10. The electrode of claim 9 wherein said intermediate layer comprises a material chosen from the group consisting of platinum, osmium, iridium, ruthenium, palladium, rhodium, platinum oxide, osmium oxide, and iridium oxide.

11. The electrode of claim 9 wherein the binding means comprises a binding agent chosen from the group consisting of borides, carbides, nitrides, oxides, and sulfides of tantalum, titanium, silicon, niobium, tungsten, molybdenum and vanadium.

12. The electrode of claim 9 wherein a water soluble, protective coating is provided on the permeable surface layer.

13. The electrode of claim 12 wherein the protective coating comprises a water soluble polymer.

14. The electrode of claim 9 wherein the substrate is titanium metal.

15. The electrode of claim 9 wherein the bimetal spinel is selected from the group consisting of $CoAl_2O_4$, $CoFe_2O_4$, $CuAl_2O_4$, $CuCo_2O_4$, $CuCr_2O_4$, $CuFe_2O$ $Fe^{II}AlFe^{III}O_4$, $MgFe_2O_4$, $NiAlO_4$ $NiFe_2O_4$, $NiCr_2O_4$, and mixtures thereof.

16. An anode comprising:
    a titanium substrate;
    an intermediate layer of platinum from 2 micro-inches to 10 micro-inches thick on said substrate; and
    an outer coating from 100 micro-inches to 500 micro-inches thick comprising $TiO_2$ and $NiAl_2O_4$.

17. An anode comprising:
    a titanium substrate;
    an intermediate layer of platinum from 2 micro-inches to 10 micro-inches thick on said substrate; and
    an outer coating from 100 micro-inches to 500 micro-inches thick comprising $TiO_2$ and $CoAl_2O_4$.

18. An anode comprising:
    a titanium substrate;
    an intermediate layer of platinum from 2 micro-inches to 10 micro-inches thick on said substrate; and
    an outer coating from 100 micro-inches to 500 micro-inches thick comprising $TiO_2$ and $FeAlFeO_4$.

19. In an electrolytic cell having therein an anode, a cathode facing said anode, and external power supply means to apply an electromotive force between said anode and cathode and to impose a positive polarity to said anode, the improvement wherein the anode comprises an electroconductive, electrolyte-impermeable substrate having an exterior surface thereon comprising a bimetal spinel.

20. The electrolytic cell of claim 19 wherein the bimetal spinel is chosen from the group consisting of $CoAl_2O_4$, $CoFe_2O_4$, $CuAl_2O_4$, $CuCo_2O_4$, $CuCr_2O_4$, $CuFe_2O_4$, $Fe^{II}AlFe^{III}O_4$, $MgFe_2O_4$, $NiAl_2O_4$, $NiFe_2O_4$, $NiCr_2O_4$, and mixtures thereof.

21. The electrolytic cell of claim 19 wherein the exterior surface of said anode comprises a binding agent chosen from the group consisting of borides, carbides, nitrides, oxides, and sulfides of tantalum, titanium, silicon, niobium, tungsten, molybdenum, and vanadium.

22. The cell of claim 19 wherein the substrate is a valve metal.

23. The cell of claim 19 wherein the substrate is titanium.

24. The cell of claim 19 wherein the anode is an electroconductive substrate having an electroconductive surface comprising a bimetal spinel and a material which is more electroconductive than the spinel interposed between and in contact with the spinel and the substrate.

25. The cell of claim 24 wherein the substrate is a valve metal and the interposed material between the valve metal and the spinel is more resistant to oxidation than the valve metal.

26. The cell of claim 25 wherein the material is a member of the group consisting of platinum, osmium, iridium, palladium, ruthenium, rhodium, platinum oxide, osmium oxide, and iridium oxide.

27. In an electrolytic cell having therein an anode, a cathode facing said anode, external power supply means to apply an electromotive force between said anode and cathode and to impose a positive polarity to said anode, and a diaphragm interposed between said anode and cathode, the improvement wherein the anode comprises an electroconductive, electrolyte-impermeable substrate having an exterior surface thereon comprising a bimetal spinel.

28. In an electrolytic cell having therein an anode, a flowing mercury amalgam cathode facing said anode, external power supply means to apply an electromotive force between said anode and said cathode and to impose a positive polarity to said anode, the improvement wherein the anode comprises an electroconductive, electrolyte-impermeable substrate having an exterior surface thereon comprising a bimetal spinel.

29. In a process of conducting electrolysis wherein an external power supply means causes an electical current to flow from an anode of an electrode pair to a cathode of said electrode pair, the improvement wherein one member of said electrode pair comprises:
- an impermeable, electroconductive, valve metal substrate; and
- an external permeable surface layer comprising particulate bimetal spinel wherein the spinel particles are contiguous and have an ultimate particle size of from 0.01 to 0.1 micron, and means for binding said particles to adjacent particles and for binding said layer to said substrate.

30. In a process of conducting electrolysis wherein an external power supply means causes an electrical current to flow from an anode of an electrode pair to a cathode of said electrode pair, the improvement wherein one member of said electrode pair comprises:
- an impermeable, electroconductive, valve metal substrate; and
- an external permeable surface layer comprising particulate bimetal spinel wherein the spinel particles are contiguous and have an ultimate particle size of from 0.01 to 0.1 micron;
- an intermediate layer comprising a material that is more electroconductive than the bimetal spinel, interposed between and in contact with the substrate and the external surface layer; and
- means for binding said particles to adjacent particles and for binding said surface layer to said intermediate layer.

31. The process of claim 30 wherein said intermediate layer comprises a material chosen from the group consisting of platinum, osmium, iridium, ruthenium, palladium, rhodium, platinum oxide, osmium oxide, and iridium oxide.

32. The process of claim 30 wherein the bimetal spinel is chosen from the group consisting of $CoAl_2O_4$, $CoFe_2O_4$, $CuAl_2O_4$, $CuCo_2O_4$, $CuCr_2O_4$, $CuFe_2O_4$, $Fe^{II}AlFe^{III}O_4$, $MgFe_2O_4$, $NiAl_2O_4$, $NiFe_2O_4$, $NiCr_2O_4$, and mixtures thereof.

33. The process of claim 30 wherein the exterior surface of said electrode comprises a binding agent chosen from the group consisting of borides, carbides, nitrides, oxides, and sulfides of tantalum, titanium, silicon, niobium, tungsten, molybdenum, and vanadium.

34. The process of claim 30, wherein the said valve metal substrate is titanium.

References Cited

UNITED STATES PATENTS

| | | | |
|---|---|---|---|
| 3,528,857 | 9/1970 | Lieb et al. | 204—290 R |
| 3,113,846 | 12/1963 | Leschen | 29—195 |
| 3,236,756 | 2/1966 | Beer | 204—290 F |
| 2,669,598 | 2/1954 | Marko et al. | 136—120 FC |
| 3,405,010 | 10/1968 | Kordesch et al. | 136—120 FC |
| 2,934,456 | 4/1960 | Schutt | 117—75 |
| 2,707,691 | 5/1955 | Wheildon, Jr. | 204—290 F |
| 3,038,817 | 6/1962 | Day et al. | 117—69 |
| 3,103,484 | 9/1963 | Messner | 204—290 F |
| 3,607,416 | 9/1971 | Sizer, Jr. | 136—86 |

FOREIGN PATENTS

| | | | |
|---|---|---|---|
| 1,164,434 | 9/1969 | Great Britain | 204—290 F |
| 1,174,451 | 12/1969 | Great Britain | 204—290 F |
| 1,195,871 | 6/1970 | Great Britain | 204—290 F |

OTHER REFERENCES

Evans, R. C., An Introduction to Crystal Chem., 2nd ed., 1964, Univ. Press Cambridge.

Chem. Abstracts, vol. 35, 4168:8, 1941.

JOHN H. MACK, Primary Examiner

R. J. FAY, Assistant Examiner

U.S. Cl. X.R.

204—242, 250, 252, 266, 290 F